US012807186B2

(12) United States Patent
Dobke et al.

(10) Patent No.: US 12,807,186 B2
(45) Date of Patent: *Nov. 24, 2026

(54) SYSTEMS AND METHODS FOR CONTROLLING A VEHICLE USING A REDUNDANT ACTUATOR CONTROL ENGINE SYSTEM

(71) Applicant: Kodiak Robotics, Inc., Mountain View, CA (US)

(72) Inventors: Alistair Dobke, Mountain View, CA (US); Albert Moser, Mountain View, CA (US); Andreas Wendel, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 18/228,101

(22) Filed: Jul. 31, 2023

(65) Prior Publication Data

US 2025/0042438 A1 Feb. 6, 2025

(51) Int. Cl.

| | |
|---|---|
| ***B60W 60/00*** | (2020.01) |
| ***B60W 50/02*** | (2012.01) |
| ***B60W 50/023*** | (2012.01) |
| ***G06F 13/16*** | (2006.01) |
| ***G06F 13/40*** | (2006.01) |

(52) U.S. Cl.

CPC .... *B60W 60/0016* (2020.02); *B60W 50/0205* (2013.01); *B60W 50/023* (2013.01); *G06F 13/1605* (2013.01); *G06F 13/4031* (2013.01); *B60W 2050/021* (2013.01)

(58) Field of Classification Search

CPC ....... B60W 2050/021; B60W 50/0205; B60W 50/023; B60W 60/0016; B60W 50/035; B60W 2050/0292; B60W 2050/0297; B60W 50/029; B60W 50/0225; B60W 2050/0215; B60W 2050/022; G06F 13/1605; G06F 13/366; G06F 13/4031; G06F 2213/36; G06F 11/0757;

(Continued)

(56) References Cited

U.S. PATENT DOCUMENTS 11,673,565 B1 * 6/2023 Dingli .................. B60W 50/14
701/29.2
2006/0015231 A1 1/2006 Yoshimura et al.

(Continued)

*Primary Examiner* — Khoi H Tran
*Assistant Examiner* — Tanner L Cullen
(74) *Attorney, Agent, or Firm* — Fox Rothschild LLP

(57) ABSTRACT

This disclosure provides systems and methods for controlling a vehicle in response to an abnormal condition. The method may include generating, by a main computing system, a nominal motion plan and a fallback motion plan for each predetermined interval from a location of the vehicle. The method may also include sending, by the main computing system, the nominal motion plan and the fallback motion plan for each predetermined interval to a redundant ACE system. The method may include detecting, by the redundant ACE system, an abnormal condition of the vehicle, and in response to the abnormal condition, controlling the vehicle, by the redundant ACE system, to perform a predetermined vehicle action comprising navigating the vehicle to a safe stop according to the last received fallback motion plan.

18 Claims, 11 Drawing Sheets

(58) Field of Classification Search
CPC ...... G06F 13/364; G06F 13/362; G06F 11/20; G06F 11/2017
See application file for complete search history.

(56) References Cited

U.S. PATENT DOCUMENTS

| | | | | |
|---|---|---|---|---|
| 2008/0229320 | A1* | 9/2008 | Ueda | G06F 9/5038 718/104 |
| 2009/0055002 | A1* | 2/2009 | Anderson | G06F 11/20 700/82 |
| 2015/0018980 | A1* | 1/2015 | Heutger | G05B 15/02 700/20 |
| 2015/0261704 | A1* | 9/2015 | Vaccaro | G06F 13/364 710/114 |
| 2017/0185550 | A1* | 6/2017 | Chellappan | G06F 1/26 |
| 2017/0199523 | A1* | 7/2017 | Barton-Sweeney | B60W 60/0015 |
| 2017/0277607 | A1* | 9/2017 | Samii | G06F 11/2033 |
| 2018/0046174 | A1 | 2/2018 | Riepl et al. | |
| 2018/0052463 | A1 | 2/2018 | Mays | |
| 2020/0339151 | A1 | 10/2020 | Batts et al. | |
| 2020/0406910 | A1* | 12/2020 | Ruan | H04L 41/16 |
| 2021/0046926 | A1 | 2/2021 | Olson et al. | |
| 2021/0269000 | A1* | 9/2021 | Broyles | B60W 30/162 |
| 2022/0017107 | A1 | 1/2022 | Shinoda et al. | |

* cited by examiner

SYSTEMS AND METHODS FOR CONTROLLING A VEHICLE USING A REDUNDANT ACTUATOR CONTROL ENGINE SYSTEM

FIELD

This disclosure relates generally to systems and methods for controlling a vehicle using a redundant actuator control engine (ACE) system.

BACKGROUND

Autonomous vehicles refer to vehicles which replace human drivers with sensors, computer-implemented intelligence, and other automation technology. Autonomous vehicles can be used to aid in the transport of passengers or items from one location to another. Such vehicles may operate in a fully autonomous mode where passengers may provide some initial input, such as a pickup or destination location, and the vehicle maneuvers itself to that location. While doing so, the safety of the passengers and the vehicle is an important consideration, especially when an abnormal condition is detected in software or hardware of the vehicle.

Therefore, for at least these reasons, systems and methods for controlling a vehicle in response to an abnormal condition are needed.

SUMMARY

This disclosure addresses the above need in a number of aspects. In one aspect, this disclosure provides a method for controlling a vehicle in response to an abnormal condition using a redundant actuator control engine (ACE) system. In some embodiments, the method may include (a) generating, by a main computing system, a nominal motion plan and a fallback motion plan for each predetermined interval from a location of the vehicle based on data received by the main computing system about environment of the vehicle, wherein the fallback motion plan is generated to safely stop the vehicle; (b) sending, by the main computing system, the nominal motion plan and the fallback motion plan for the each predetermined interval to a redundant actuator control engine (ACE) system comprising a first ACE and a second ACE; (c) updating an existing nominal motion plan and an existing fallback motion plan in the first ACE and the second ACE, by the redundant ACE system, with the nominal motion plan and the fallback motion plan, respectively, for the each predetermined interval; (d) controlling the vehicle, by one of the first ACE and the second ACE to control, according to the nominal motion plan; (e) detecting, by the redundant ACE system, an abnormal condition of the vehicle; and (f) in response to the abnormal condition, assigning by a redundancy arbitration logic one of the first ACE and the second ACE as a primary ACE to control the vehicle and perform a predetermined vehicle action comprising navigating the vehicle to a safe stop based on an output actuator command generated by the primary ACE according to the fallback motion plan that is received immediately before detection of the abnormal condition.

In some embodiments, the redundancy arbitration logic is separate and isolated from other control system application components. In some embodiments, the redundancy arbitration logic determines roles of the other control system application components.

In some embodiments, the redundancy arbitration logic receives health scores from the other control system application components. In some embodiments, the redundancy arbitration logic receives health scores from the first ACE and the second ACE.

In some embodiments, a health score of 0-1 represents that an application component is malfunctioning or has failed; a health score of 2-7 represents that the application component is functioning but is not ready for use; a health score of 8-14 represents that the application component is functioning and producing output, but the output quality is degraded from nominal; and/or a health score of 15 represents that the application component is functioning normally.

In some embodiments, a health score of 0-1 represents that the first ACE or the second ACE is malfunctioning or has failed; a health score of 2-7 represents that the first ACE or the second ACE is functioning but is not ready for use; a health score of 8-14 represents that the first ACE or the second ACE is functioning and producing output, but the output quality is degraded from nominal; and/or a health score of 15 represents that the first ACE or the second ACE is functioning normally.

In some embodiments, the redundancy arbitration logic assigns one of the first ACE and the second ACE that has a higher health score is assigned as the primary ACE. In some embodiments, the redundancy arbitration logic assigns one of the first ACE and the second ACE that has a lower health score is assigned as a backup ACE.

In some embodiments, the redundant ACE system is configured to control the vehicle upon detection of the abnormal condition without further communicating with the main computing system.

In another aspect, this disclosure provides a system of controlling an autonomous vehicle in response to an abnormal condition. In some embodiments, the system comprises a main computing system, a redundant actuator control engine (ACE) system comprising a first actuator control engine (ACE) and a second actuator control engine (ACE), and a redundancy arbitration logic, wherein the main computing system is configured to: (a) generate a nominal motion plan and a fallback motion plan for each predetermined interval from a location of the vehicle based on data received by the main computing system about environment of the vehicle, wherein the fallback motion plan is generated to safely stop the vehicle; and (b) send the nominal motion plan and the fallback motion plan for the each predetermined interval to the first ACE and the second ACE of the redundant ACE system; and wherein the redundant ACE system is configured to: (i) update an existing nominal motion plan and an existing fallback motion plan in the first ACE and the second ACE with the nominal motion plan and the fallback motion plan, respectively, for the each predetermined interval; (ii) control the vehicle according to the nominal motion plan; (iii) detect an abnormal condition of the vehicle; and (iv) in response to the abnormal condition, cause the redundancy arbitration logic to assign one of the first ACE and the second ACE as a primary ACE to control the vehicle to perform a predetermined vehicle action comprising navigating the vehicle to a safe stop based on an output actuator command generated by the primary ACE according to the fallback motion plan that is received immediately before detection of the abnormal condition.

DETAILED DESCRIPTION

Figure 1:
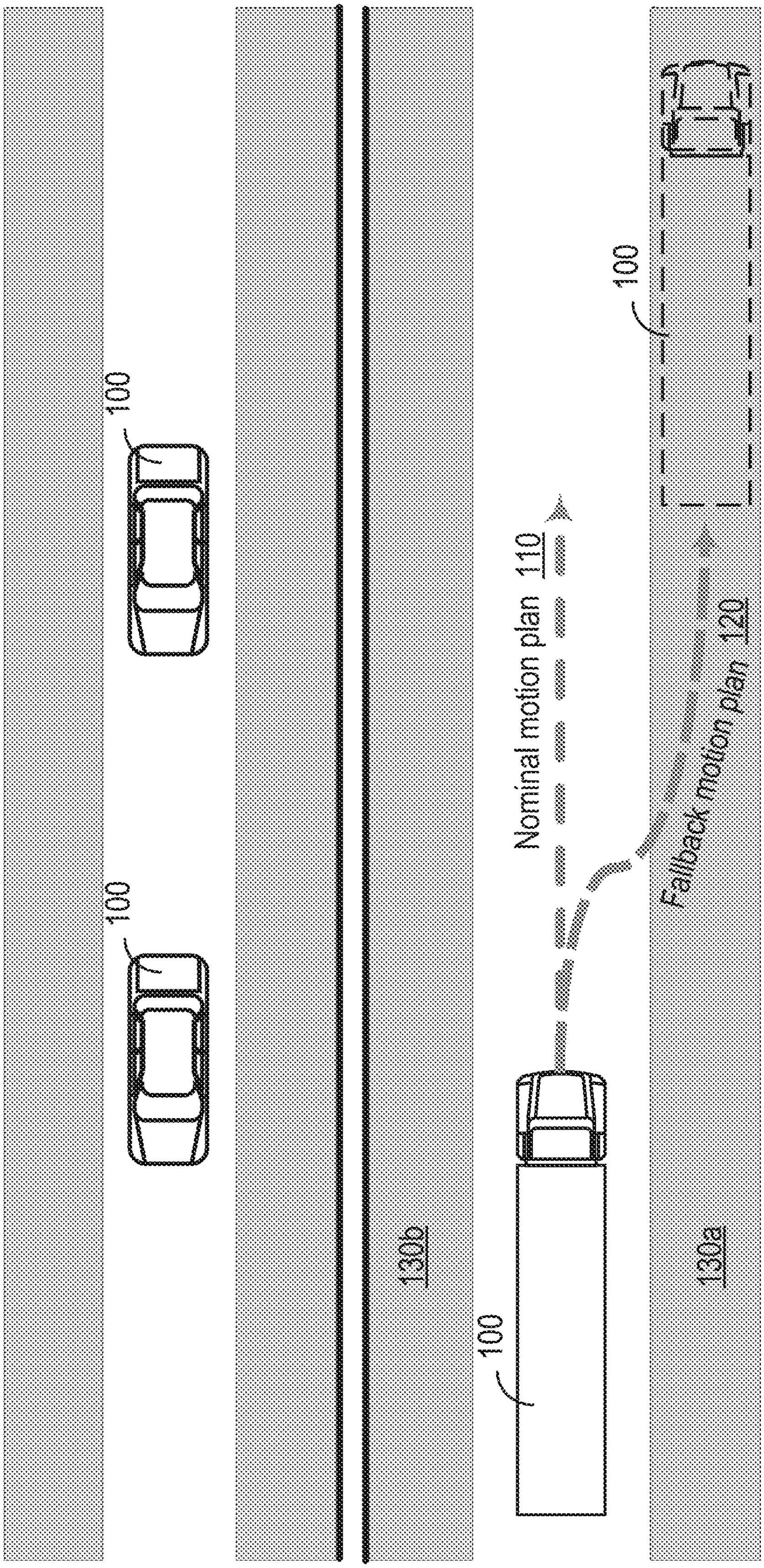
FIG. 1 is a diagram showing a response by an automated vehicle in case of an abnormal condition, according to various embodiments of the present disclosure.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. These terms are merely intended to distinguish one component from another component, and the terms do not limit the nature, sequence or order of the constituent components.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit," "-er," "-or," and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated.

In addition, terms of relative position such as "vertical" and "horizontal," or "front" and "rear," when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility," and the like each refer to a non-transitory device on which computer-readable data, programming instructions or both are stored. Except where specifically stated otherwise, the terms "memory," "memory device," "computer-readable storage medium," "data store," "data storage facility," and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "instructions" and "programs" may be used interchangeably herein. The instructions may be stored in object code format for direct processing by the processor, or in any other computing device language, including scripts or collections of independent source code modules that are interpreted on demand or compiled in advance. Functions, methods, and routines of the instructions are explained in more detail below. The instructions may be any set of instructions to be executed directly (such as machine code) or indirectly (such as scripts) by the processor. For example, the instructions may be stored as computing device code on the computing device-readable medium.

The term "data" may be retrieved, stored or modified by processors in accordance with a set of instructions. For instance, although the claimed subject matter is not limited by any particular data structure, the data may be stored in computing device registers, in a relational database as a table having a plurality of different fields and records, XML documents or flat files. The data may also be formatted in any computing device-readable format.

The term "module" or "unit" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, autonomous vehicles, sports utility vehicles, vans, buses, commercial vehicles, etc.), boats, drones, trains, and the like.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer-readable media on a computer-readable medium containing executable programming instructions executed by a processor, controller, or the like. Examples of computer-readable media include, but are not limited to, ROM, RAM, compact disc (CD)-ROMs, magnetic tapes, floppy disks, flash drives, smart cards, and optical data storage devices. The computer-readable medium can also be distributed in network-coupled computer systems so that the computer-readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example, within two standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, systems and methods for controlling a vehicle in response to an abnormal condition, according to embodiments of the present disclosure, will be described with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

With reference to FIG. 1, automated vehicles, e.g., an automated vehicle 100, may be required to enter a failsafe condition to bring the automated vehicles to a safe stop in case of any number of potential failures which can prevent the automated vehicles from completing their mission goal. To facilitate this, a motion planning system of the automated vehicle 100 will continuously produce two motion plans during nominal operation: (i) a nominal motion plan 110, which drives the vehicle to its desired destination. This nominal motion plan 110 will operate the automated vehicle 100 for, e.g., the next 10 to 15 seconds; and (ii) a fallback motion plan 120, which navigates the vehicle to a safe stop. In navigating the automated vehicle 100 to a safe stop, the automated vehicle 100 may be decelerated and pulled over to a safe location, such as a left or right shoulder if available (e.g., shoulder 130*a* or 130*b*), and drive on the shoulder to align the automated vehicle 100 before a complete stop. If a safe location for pullover is not available, the automated vehicle 100 may be decelerated and brought to a complete stop in lane.

Figure 2:
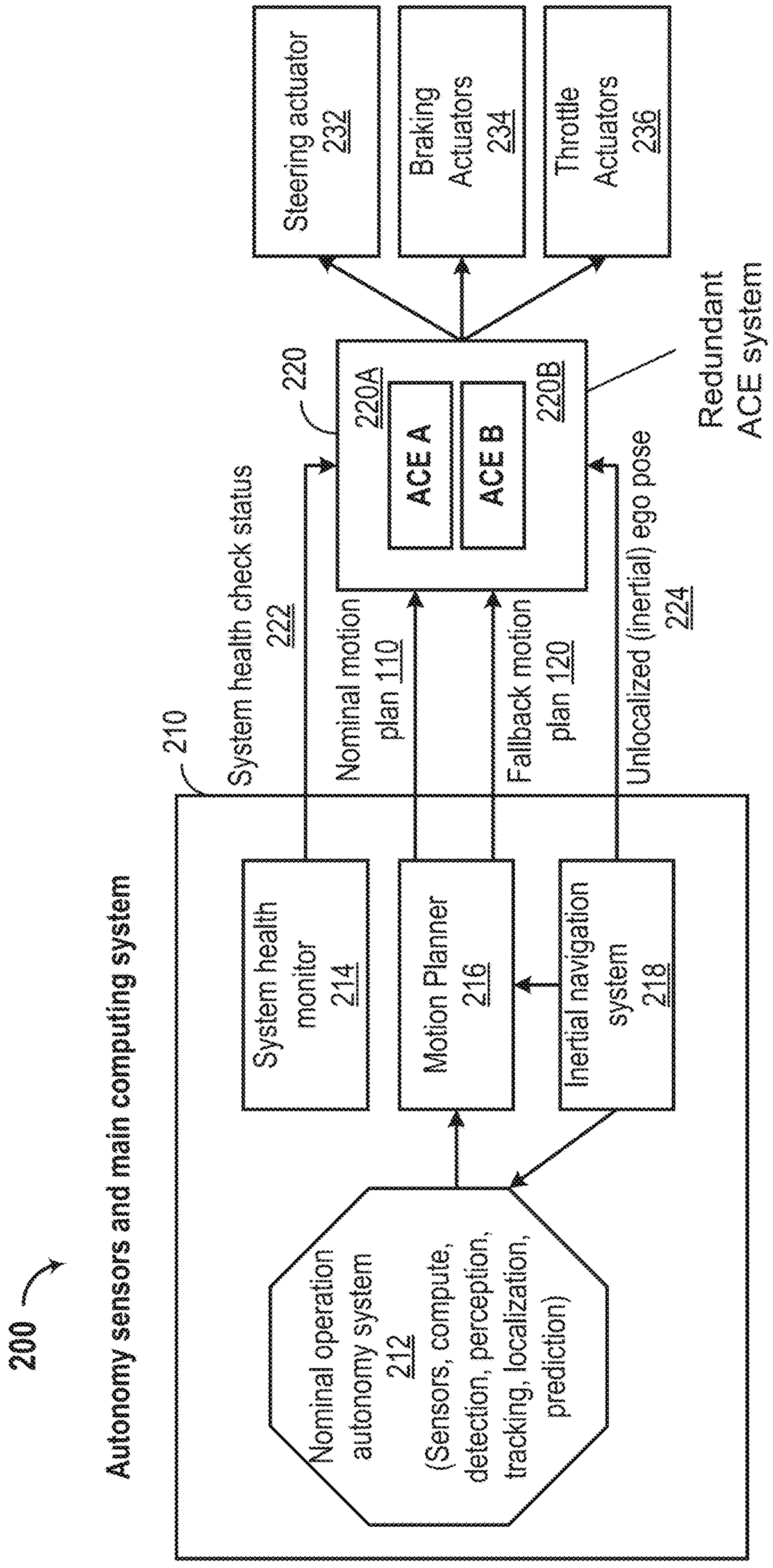
FIG. 2 illustrates an example system for controlling a vehicle in response to an abnormal condition, according to various embodiments of the present disclosure.

Referring now to FIG. 2, the automated vehicle 100 may be any type of vehicle including, but not limited to, cars, trucks, motorcycles, busses, recreational vehicles, etc. The automated vehicle 100 may include one or more computing systems/devices 200, including a main computing system 210 and a redundant ACE system 220 (also referred to as a redundant embedded vehicle controller in FIG. 2). The main computing system 210 may include one or more processors, memory, and other components typically present in general purpose computing devices. Similarly, the redundant ACE system 220 may also include one or more processors, memory, and other components typically present in general purpose computing devices.

The one or more computing systems 200 may be part of an autonomous driving computing platform incorporated into the automated vehicle 100. The main computing system 210 may include planning, position, and perception systems. The perception system generates motion plans to navigate the vehicle to a location or around objects, the positioning system determines the position of the automated vehicle 100, and the perception system detects objects or obstacles in the vehicle's environment. The perception system may include a plurality of sensors, such as a light detection and ranging (LiDAR) system, a radio detection and ranging (RADAR) system, or a camera, configured to detect and identify objects or obstacles in the environment of the automated vehicle 100. The planning system may use data from the perception system and the positioning system in conjunction with detailed map information in order to generate motion plans for the automated vehicle to achieve a mission goal, such as arriving at a particular location.

In some cases, the planning, position, or perception system may be entirely distinct from the main computing system 210. For example, the positioning system may be implemented as a standalone device, independent of the main computing system 210. This may allow the secondary computing system to use the output of the positioning system to follow a fallback motion plan as discussed below.

The redundant ACE system 220 may be less complex than the main computing system 210 and can operate independently of the main computing system 210. It may be sophisticated enough to maneuver the vehicle based on information received from the main computing system 210, but may lack the sophisticated perception and planning systems of the main computing system 210. In case of a software or hardware failure, the redundant ACE system 220 can control the heading and speed of the automated vehicle without further information from the main computing system 210. To do so, the redundant ACE system may continuously receive inputs from the main computing system 210, such as a nominal motion plan 110 and a fallback motion plan 120, at a predetermined interval. The information may further include a system health status and an inertial pose of the automated vehicle 100.

For example, the main computing system 210 may include a nominal operation autonomy system 212, which is responsible for sensing, computing, detection, perception, tracking, localization, and/or prediction. The main computing system 210 may further include an inertial navigation system (INS) 218, which transmits the information about the vehicle's inertial ego pose to the nominal operation autonomy system 212. The main computing system 210 and/or the redundant ACE system 220 may determine a motion plan to navigate the vehicle to a destination location completely autonomously using data from the nominal operation autonomy system 212 and the inertial navigation system 218. The data may include detailed map information identifying the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane.

The main computing system may further include a system health monitor 214, a motion planner 216, and an inertial navigation system 218. The system health monitor 214 detects any failure associated with hardware or software components of the automated vehicle 100 and communicates a system health check status 222 with the redundant ACE system 220 comprising a first ACE (ACE A) 220A, and a second ACE (ACE B) 220B. Non-limiting examples of failures include overheating of the main computing system, a hardware or software failure on the main computing system, a timing delay in producing a valid motion plan on the main computing system, a cable failure in main computing hardware, a failure in signal inputs or outputs by the main computing system, a power interruption or loss of the main computing hardware, a hardware or software failure of a sensor, power interruption or loss of the sensor, mechanical failures of the vehicle, a sudden tire pressure loss, or a communication failure during remote teleoperation.

The main computing system 210 may include a motion planner 216, which continuously generates the nominal motion plan 110 and the fallback motion plan 120 from a location of the automated vehicle 100 for every predetermined interval, based on the information about the environment of the automated vehicle 100 received, for example, from the nominal operation autonomy system 212. The nominal motion plan 110 is generated to achieve a mission goal, such as bringing the automated vehicle 100 to a desired future location. The fallback motion plan 120 is generated to navigate the automated vehicle 100 to a safe stop. The predetermined interval may be determined by the amount of time for a LiDAR to calculate its detected signals and transmit outputs to the motion planner 216.

The motion planner 216 transmits the nominal motion plan 110 and the fallback motion plan 120 to the redundant ACE system 220 (i.e., the first actuator control engine (ACE A) 220A, and a second actuator control engine (ACE B) 220B) at every predetermined interval. After receiving the nominal motion plan 110 and the fallback motion plan 120, the redundant ACE system 220 stores and updates the existing nominal motion plan and the existing fallback motion plan in the first actuator control engine (ACE A) 220A, and a second actuator control engine (ACE B) 220B with the newly received nominal motion plan 110 and the newly received fallback motion plan 120, respectively.

Upon detection of an abnormal condition, the redundant ACE system 220 will cause one of the first actuator control engine (ACE A) 220A, and a second actuator control engine (ACE B) 220B to transition to a failsafe mode and bring the automated vehicle 100 to a safe stop by generating an output actuator command according to the last received fallback motion plan. The last received fallback motion plan is the fallback motion plan 120 received immediately before an abnormal condition of the automated vehicle 100 is detected. For example, the fallback motion plan may control a steering actuator 232, braking actuators 234, and throttle actuators 236 to cause the automated vehicle 100 to decelerate (e.g., by decreasing the fuel supplied to the engine, changing gears, and/or by applying brakes), change direction (e.g., by turning the front or rear wheels of the automated vehicle 100), and signal such changes (e.g., by lighting turn signals).

Generally, the only inputs required for a vehicle controller to bring an automated vehicle 100 to a safe stop are 1) a current inertial ego pose received from the inertial navigation system 218, and 2) the last fallback motion plan 120 generated by a healthy autonomy system. The redundant ACE system 220 can be implemented as a small dedicated redundant hardware component, using much simpler hardware than what is needed for the main autonomy system. The redundant ACE system 220 can be lower power and lower computational capability.

Figure 3:
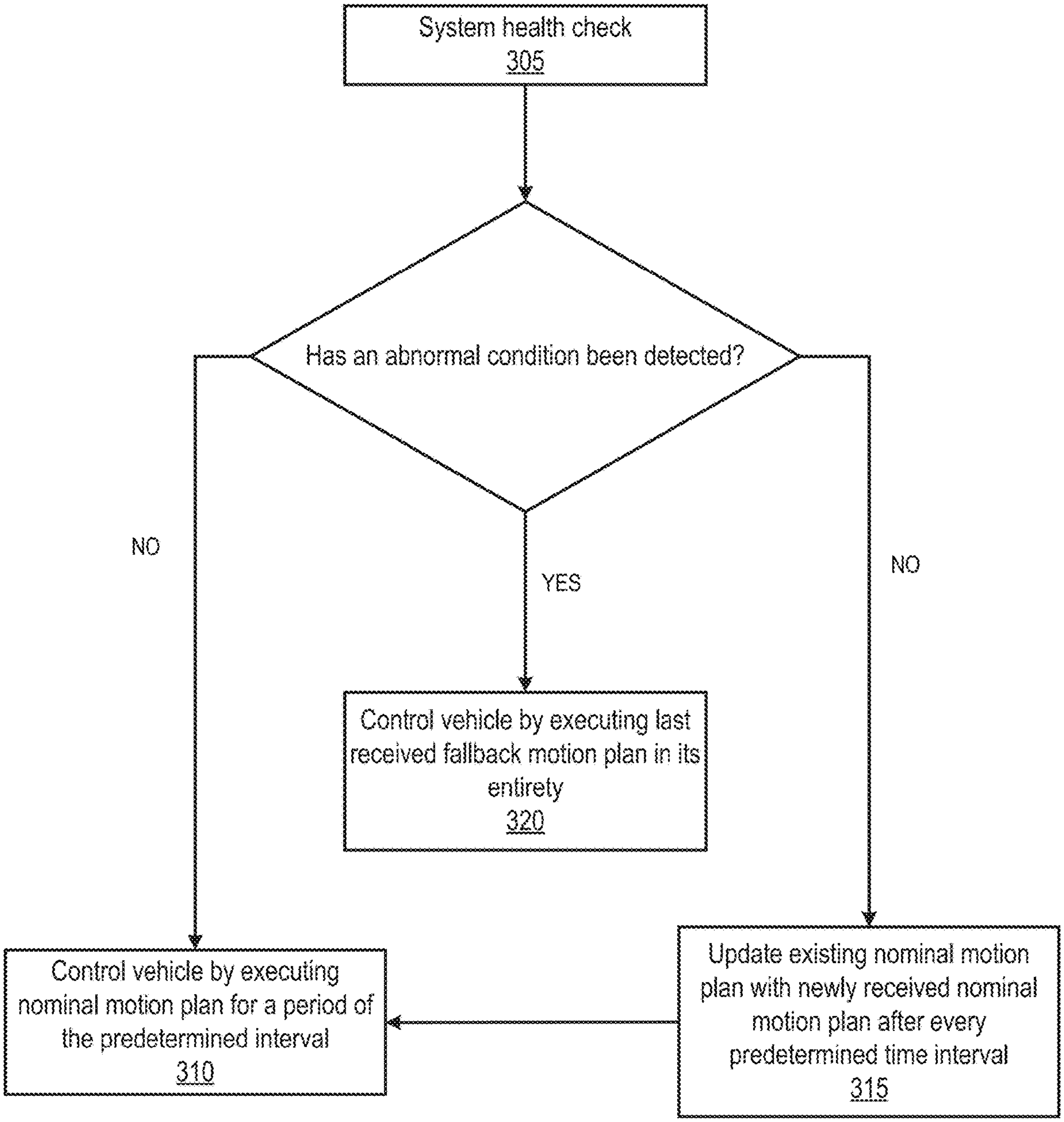
FIG. 3 is an example flowchart showing a response by an automated vehicle with respect to a nominal motion plan and a fallback motion plan, according to various embodiments of the present disclosure.

Referring now to FIG. 3, an example flowchart of a method 300 for controlling the automated vehicle 100 in response to an abnormal condition of the automated vehicle 100 is provided, in accordance with various embodiments of the present disclosure. At 305, a status of a system health check determined by the system health monitor 214 is received by the redundant ACE system 220. If no abnormal condition is detected, the redundant ACE system 220 stores and updates the existing nominal motion plan and the existing fallback motion plan with the newly received nominal motion plan and the newly received fallback motion plan generated by the motion planner 216. The redundant ACE system 220 controls the automated vehicle 100 by executing the first period of the predetermined interval (e.g., the first 100 ms) of the nominal motion plan 110 and stores the last received fallback motion plan 120.

If an abnormal condition of the automated vehicle 100 is detected, the redundant ACE system 220 will transition to the fallback motion plan 120 and execute the last received fallback motion plan in its entirety to navigate the automated vehicle 100 to a safe stop. In addition, after an abnormal condition is detected, the secondary computing system 220 will ignore new fallback plans, and the existing fallback plan will not be updated. This prevents the redundant ACE system 220 from acting on bad data received from a failing main computing system 210 or from attempting to follow an unfeasible or unsafe motion plan where the automated vehicle 100 has already moved off of the nominal motion plan 110, such as when the automated vehicle 100 has begun to pull over according to the fallback motion plan 120.

Figure 4:
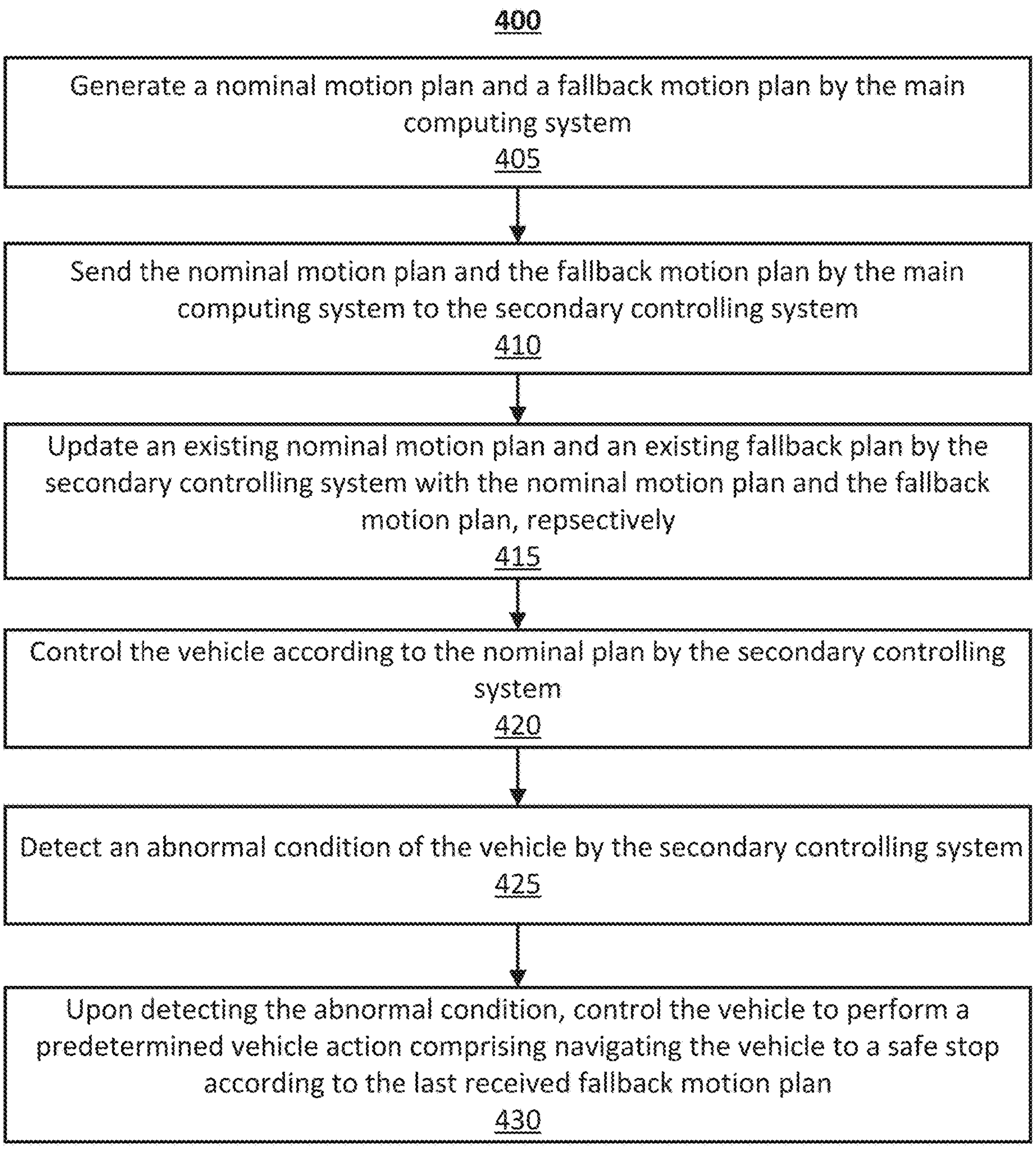
FIG. 4 is an example flowchart of a method for controlling a vehicle in response to an abnormal condition, according to various embodiments of the present disclosure.

Referring now to FIG. 4, an example flowchart of a method 400 for controlling a vehicle, such as the automated vehicle 100, in response to an abnormal condition as described, in accordance with various embodiments of the present disclosure.

At 405, the method may include generating, by the main computing system 210, a nominal motion plan 110 and a fallback motion plan 120 for each predetermined interval from a location of the automated vehicle 100 based on data received by the main computing system 210 about the environment of the automated vehicle 100. The nominal motion plan 110 is generated to navigate the automated vehicle 100 to a further destination. The fallback motion plan 120 is generated to navigate the automated vehicle 100 to a safe stop.

In some embodiments, the main computing system 210 is configured to receive the data about the environment of the automated vehicle 100 from a perception unit comprising a LiDAR system, a radio detection and ranging (RADAR) system, or a camera.

In some embodiments, the predetermined interval may be determined based on the amount of time a LiDAR calculates detected signals and transmits to the motion planner 216. In some embodiments, the predetermined interval is about 100 ms.

At 410, the method may include sending, by the main computing system 210, the nominal motion plan 110 and the fallback motion plan 120 for each predetermined interval to a redundant ACE system 220.

At 415, after the secondary computing system 220 (i.e., the first ACE 220A and the second ACE 220B) receives the nominal motion plan 110 and the fallback motion plan 120, the method may include updating an existing nominal motion plan and an existing fallback motion plan in the first ACE 220A and the second ACE 220B with the nominal motion plan 110 and the fallback motion plan 120, respectively, for each predetermined interval.

At 420, the method may include controlling the automated vehicle 100, by one of the first ACE 220A and the second ACE 220B, by generating an output actuator command according to the nominal motion plan 110. In some embodiments, the output actuator command may include a steering actuator command, a braking actuator command, and/or a throttle actuator command.

At 425, the method may include detecting, by the redundant ACE system 220, an abnormal condition of the automated vehicle 100, based on the input about a system health check status 222 from the system health monitor 214. In some embodiments, the abnormal condition may include: overheating of the main computing system, a hardware or software failure on the main computing system, a timing delay in producing a valid motion plan on the main computing system, a cable failure in main computing hardware, a failure in signal inputs or outputs by the main computing system, a power interruption or loss of the main computing hardware, a hardware or software failure of a sensor, power interruption or loss of the sensor, mechanical failures of the automated vehicle 100, a sudden tire pressure loss, a communication failure during remote teleoperation, or a combination thereof.

In some embodiments, the method may also include absent detection of the abnormal condition, controlling the automated vehicle 100, by the redundant ACE system 220, according to the nominal motion plan 110 for a period of the predetermined interval. For example, absent any abnormal condition, the redundant ACE system 220 (i.e., the first ACE 220A and the second ACE 220B) controls the automated vehicle 100 by executing the first about 100 ms of the nominal motion plan 110.

At 430, the method may further include in response to the abnormal condition, controlling the automated vehicle 100, by the redundant ACE system 220 (i.e., the first ACE 220A and the second ACE 220B), to perform a predetermined vehicle action that may include navigating the automated vehicle 100 to a safe stop according to the fallback motion plan 120 that is received immediately before detection of the abnormal condition. In some embodiments, one of the first ACE 220A and the second ACE 220B is configured to perform the fallback motion plan 120 in its entirety.

Under a nominal condition, the redundant ACE system 220 will continuously checking if the first ACE 220A and the second ACE 220B are operating normally, and if not, which one of if the first ACE 220A and the second ACE 220B is not operating normally. To check if the first ACE 220A and the second ACE 220B are operating normally, the redundant ACE system 220 will compare the fallback motion plans received by the first ACE 220A and the second ACE 220B to determine if they are identical. If they are identical, it generally indicates both the first ACE 220A and the second ACE 220B are operating normally. Alternatively, the redundant ACE system 220 will compare the output actuator commands generated by the first ACE 220A and the second ACE 220B to determine if they are identical. If they are identical, it generally indicates both the first ACE 220A and the second ACE 220B are operating normally. If both the first ACE 220A and the second ACE 220B are operating normally, either of them can be selected to perform a fallback motion plan when an abnormal condition is detected.

However, in the event that the fallback motion plans received by the first ACE 220A and the second ACE 220B are not identical or that the output actuator commands generated by the first ACE 220A and the second ACE 220B are not identical, the redundant ACE system 220 will need to identify which one of the first ACE 220A and the second ACE 220B is not operating normally. To identify a malfunctioning ACE, the redundant ACE system 220 may cause the first ACE 220A and the second ACE 220B re-calculate output actuator commands. For each of cause the first ACE 220A and the second ACE 220B, the re-calculated output actuator command will be compared with the previous one for the same fallback motion plan. For each ACE, if the re-calculated output actuator command is different from the previous one, it indicates that the ACE fails to calculate consistent results and is likely malfunctioning. Such re-calculation may be carried out one or more times until the redundant ACE system 220 identifies the malfunctioning ACE.

In some embodiments, the method further comprises: comparing a fallback motion plan received by the first ACE 220A with a fallback motion plan received by the second ACE 220B at the same time as the first ACE; and determining if the fallback motion plan received by the first ACE 220A is identical to the fallback motion plan received by the second ACE 220B.

In some embodiments, the method comprises: determining that the vehicle has encountered an abnormal condition if the fallback motion plan received by the first ACE 220A is not identical to the fallback motion plan received by the second ACE 220B.

In some embodiments, the method comprises: comparing an output actuator command generated by the first ACE 220A with an output actuator command generated by the second ACE 220B at the same time as the first ACE; and determining if the output actuator command received by the first ACE 220A is identical to the output actuator command plan generated by the second ACE 220B.

In some embodiments, the method comprises: determining that the vehicle has encountered an abnormal condition if the output actuator command received by the first ACE 220A is not identical to the output actuator command plan generated by the second ACE 220B.

In some embodiments, the method comprises: determining which one of the first ACE 220A and the second ACE 220B operates normally when fallback motion plans received by the first ACE 220A and the second ACE 220B are not identical or when output actuator commands generated by the first ACE 220A and the second ACE 220B are not identical.

In some embodiments, the step of determining which one of the first ACE 220A and the second ACE 220B operates normally comprises: (a) causing the first ACE 220A and the second ACE 220B to re-calculate output actuator commands; (b) determining if a re-calculated output actuator command is identical to a previous output actuator command for the first ACE 220A and the second ACE 220B, respectively; and (c) identifying the first ACE 220A or the second ACE 220B as a normally operating ACE if the re-calculated output actuator command is identical to the previous output actuator command.

In some embodiments, the method comprises: selecting the normally operating ACE out of the first ACE 220A and the second ACE 220B to perform the fallback motion plan.

In some embodiments, the redundant ACE system 220 is configured to control the automated vehicle by executing the fallback motion plan 120 in its entirety.

In some embodiments, in response to the abnormal condition, the redundant ACE system 220 will not update the fallback motion plan 120 received immediately before detection of the abnormal condition with a newly received fallback motion plan 120. In some embodiments, the redundant ACE system 220 is configured to control the automated vehicle 100 upon detection of the abnormal condition without further communicating with the computing system. This prevents the redundant ACE system 220 from acting on bad data received from a failing main computing system 210.

In some embodiments, the predetermined vehicle action may include slowing down the automated vehicle 100 to a predetermined speed (e.g., about 40 mph) or below. In some embodiments, the predetermined vehicle action may include moving the automated vehicle 100 to a safe location, such as a left or right shoulder (i.e., shoulder 130*a* or shoulder 130*b* as depicted in FIG. 1).

In some embodiments, the predetermined vehicle action may include moving the automated vehicle 100 on the shoulder and aligning the automated vehicle 100 with the shoulder before a complete stop. If a shoulder is narrow, the automated vehicle 100 will pull into a narrow shoulder as much as possible. In some embodiments, an appropriate shoulder may be selected at mapping time. Generally, the shoulder as selected is a paved and flat shoulder.

In some embodiments, the predetermined vehicle action may include slowing down and stopping the automated vehicle 100 in lane if a pullover to a safe location is not possible.

Figure 5:
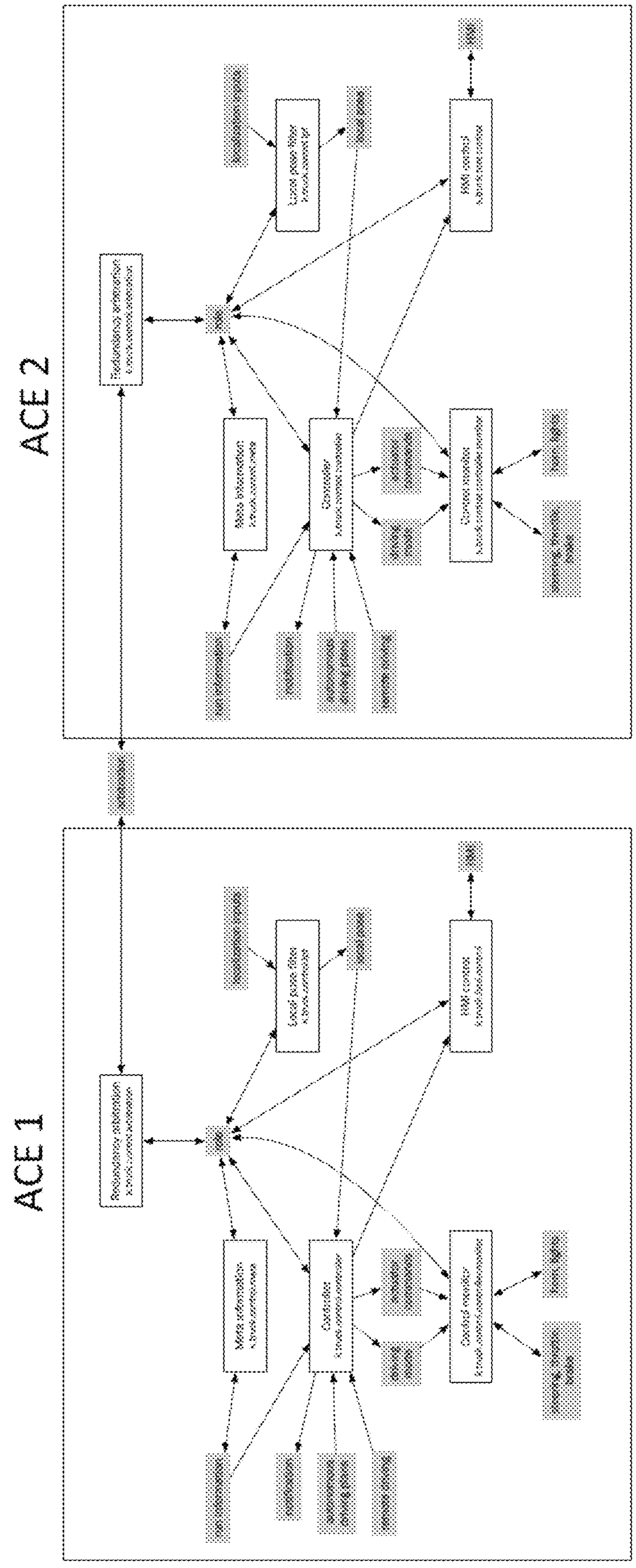
FIG. 5 illustrates an example architecture of the Actuation Control Engine (ACE) hardware platform.

Referring now to FIG. 5, an example architecture of the actuation control engine (ACE) hardware platform is illustrated. The control system software runs on the ACE hardware platform. The control system has two ACEs, which operate as independent computation nodes. These nodes are the control system instances. The two ACEs have identical function and connections. The ACE provides a platform, the application environment, on which to run the control system's application software. It provides the computation, storage, and communication resources that these applications need, along with an interface for using those resources. The ACE also provides a set of service functions that can be used for manufacture, diagnostics, and upgrade. The ACE is also a node in the onboard Ethernet network. In that role, it is expected to switch Ethernet frames passing through the ACE destined for other nodes. It also maintains clock synchronization with other nodes in the autonomous vehicle.

An autonomous vehicle may contain two ACEs for redundancy. The system expects the ACEs to form a primary-backup pair, with one ACE providing functionality and the other on hot standby to take over if the first ACE fails. The ACEs provide redundancy arbitration to determine which node is the primary and which is the backup. The redundancy approach applies to the ACE as a whole, rather than to individual services running on the ACE. That is, all of the functions on an ACE are jointly primary, backup, or failed; having one function on one ACE be primary and a different function on the other ACE be primary for that second function is not supported. This design decision has been made in order to reduce complexity (by having a single instance of redundancy logic on each ACE) and to reduce communication traffic for managing redundancy roles. This decision comes at a cost of lower system reliability: any application function failing on an ACE makes the redundancy logic treat that entire ACE as failed. This is a decision that can be revisited in future by providing each application function its own individual redundancy state and arbitration logic.

The ACE also goes through transient states in addition to these states. When powered off, the ACE is inert: it performs no functions, answers no communication, has no effect on driving behavior, and generates no heat. In operational state, the application environment is running. Application components are started, run, and restarted as necessary. While in operational state, service functions are limited to ones that can be performed without interfering with application behavior: limited diagnostics and some log retrieval actions are possible. In service state, the application environment is not running and thus no applications are running. All service functions are available, except those that depend on applications running (such as retrieving logs as applications run). In particular, the ACE can be upgraded in service state. In failed state, the state of both the application environment and service functions are indeterminate. It may be possible to perform some service functions, or it may not. The only function guaranteed to work is to restart the ACE, either by power cycling or by using a discrete reset function.

Figure 6:
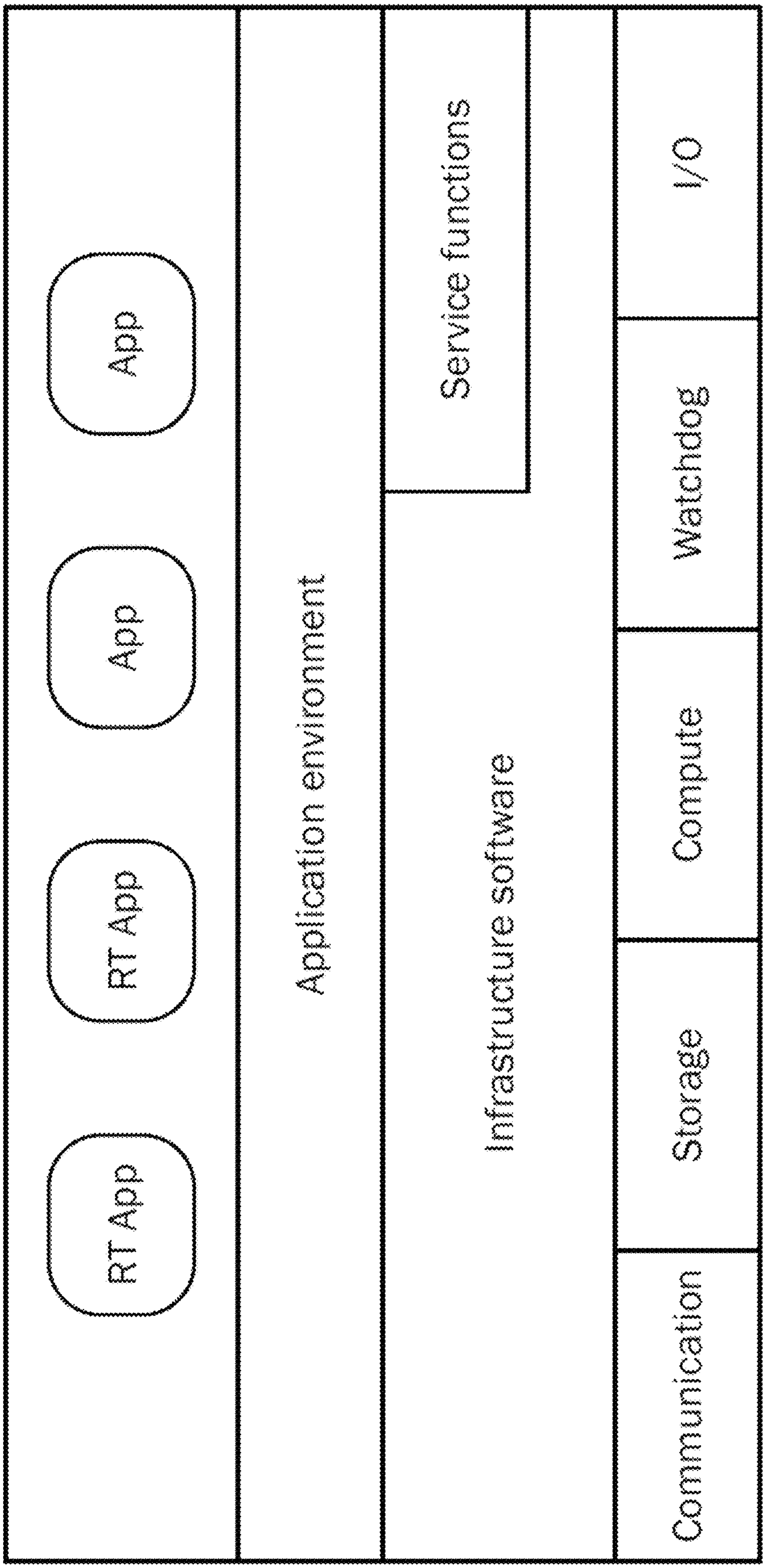
FIG. 6 illustrates a layered fashion for organizing the information and functions that the ACE maintains and provides.

As shown in FIG. 6, the information and functions that the ACE maintains and provides is organized in a layered fashion. The top layer consists of the control system application software that is running on the ACE. Each application has relevant state that is stored by the ACE: its software image, security credentials, configuration information, and other data that the application may choose to store. There are two kinds of applications: real time applications and non-real time. Realtime applications get access to resources in ways that allow guarantees on performance and behavior; non-real time applications get best-effort access.

The application environment implements the environment in which the applications run. This environment provides isolation between applications and access to ACE resources. The application environment maintains state that includes the software image environment, security credentials, and information about what applications are installed and what resources and privileges they have. The application environment also provides some common services to all the applications, such as logging; the environment maintains state related to these services. The service functions provide the ability to manipulate the state of an ACE at a low level—updating software images and security credentials, reading out configuration settings, or running diagnostics. The infrastructure software is the collection of low-level operating system and firmware that controls access to the ACE node resources. This includes the software images for these components, configuration settings, as well as low-level security credentials for identifying the ACE node and authenticating other nodes. All these software functions are implemented using a set of hardware resources, including communication (networking), storage, compute, watchdog, and input-output functions. All of these hardware resources have their own state: whether they are on or off, persistent contents, and transient state.

Each ACE node provides one redundant instance of the control system. Each node, when in operational state, attempts to communicate with the other ACE instance in order to determine what role the node should play. The states include:

- Pending: when the node has not yet determined what its role is. In this state, it should not be sending output as primary.
- Single primary: the node has determined that it should act as the primary, and it believes that it does not have a backup.
- Shared primary: the node has determined that it should act as primary, and believes that it believes that there is a functioning backup node.
- (Shared) backup: the node has determined that it should act as a backup.

The single and shared primary states are distinguished because there are differences in high-level autonomous vehicle behavior expected. In particular, when there is only a single primary, the autonomous vehicle should pull over and stop rather than continuing to drive.

The inter-ACE interfaces are used to coordinate the redundancy between the two ACEs in an autonomous vehicle. There are three interfaces:

| Interface | Purpose and functions |
| --- | --- |
| Arbitration communication | Communication over CAN bus between the redundancy arbitration logic application components on each ACE |
| Throttle PWM passthrough | Lines to control how throttle input is shared between ACEs and which ACE can generate throttle output |

Each ACE implements the driving and autonomy interfaces defined at the control system level. Each ACE reads all incoming data on these interfaces at all times while operational, but only outputs on these interfaces when its role is primary. Each ACE implements the autonomous vehicle system interfaces defined at the control system level. Each ACE reads all incoming data on these interfaces at all times while operational, but only outputs on these interfaces when its role is primary. Each ACE implements the platform interfaces defined at the control system level. Each ACE has its own clock sync, service, logging, and status interfaces; these are active as long as the ACE is powered on (with some exceptions in some failed state situations). Each ACE reads incoming data on the HMI interface while operational, but only outputs on this interface when its role is primary.

The ACE's hardware may be placed in a rack inside the autonomous vehicle's cabin. It must meet the environmental requirements for that part of the autonomous vehicle. Each ACE receives power from the power distribution unit. While the ACE has support for redundant power inputs, that is not expected to be exercised in the current autonomous vehicle design. For correct system operation, in the current design, the second power input must not be connected to another power source, because the power and thermal control components expect to be able to control the ACE's on-off state by commanding the PDU to turn power on or off to an ACE.

The ACEs are connected to each other using a custom cable harness, as defined in the ACE hardware design. This cable harness has features that create a distinction between the two ACE hardware boxes, which allows the PWM signal pass through to work correctly. Correct ACE operation depends on the correct manufacture and installation of this cable harness. The ACEs communicate with other components through Ethernet, CAN buses, and other signal lines, as documented above.

The ACE provides multiple functions, and those functions may be implemented in a collection of independent application software components. The redundancy approach can work in terms of the whole ACE or in terms of individual applications; the choice is the whole ACE. Working in terms of the whole ACE has the advantage that there is only one implementation of redundancy logic involved, instead of implementing it once for each application. It results in there being one common interface that all applications running on the ACE use to learn about the role they should fill. It also allows for a clean logic for starting up an ACE, particularly if an ACE is starting up while the other is running and controlling the autonomous vehicle. The whole-ACE approach should result in a modest reduction in heartbeat message traffic between the ACEs.

Working in terms of each application individually has the advantage that it may result in slightly higher availability. For example, it could allow for a situation where the local pose filter was running correctly on one ACE and the controller on the other, but neither ACE had both local pose filter and controller running correctly.

The whole-ACE redundancy is advantageous because it implements the redundancy logic only once and has a common interface for all applications was compelling for reducing the complexity of code to be written and for reducing the number of independent bugs that could be introduced with per-application redundancy logic.

Power. The ACE hardware can be powered on or off. It is powered off when it receives no power from either power input. When power is applied, at minimum the service processor will start up; other hardware components may get powered up based on decisions made by the service processor. The ACE as a whole, therefore, has many different power states, depending on which components the service processor has decided should be on.

Persistent state in storage. The ACE stores the software images that it runs when it starts up. This includes operating system images for the main and service processors and firmware for other hardware components. The ACE hardware has the following states:

Power. The ACE hardware also maintains security state. This includes the keys or certificates that the hardware uses to verify the authorization and integrity of software images before loading them, and the keys or certificates that software later uses to authenticate its communications with other components. The ACE begins to power up when it begins to receive power on at least one of its power inputs. Initially, this causes the service processor to start up. As the service processor starts up, it performs an initial self-test, then attempts to boot the service processor's software image. In the process of booting the software, the boot mechanism checks that the image is authorized and has not been corrupted. Once the service processor has started, it can in turn cause the Ethernet switch and main processor to start up. Each of those in turn performs a self-test, then boots its own software image. Each boot process must check the integrity and authorization of its software image. The service processor may choose to shut down or restart the main processor or Ethernet switch.

Configuration. The ACE hardware maintains a persistent, machine-readable version of its model information and serial number, which is used by software on the service and main processors. This configuration information must not be modifiable by ordinary application software. The ACE's model and serial number information are loaded into the ACE hardware during manufacture. They are not modifiable by ordinary means after manufacture, although a repair process may be defined to modify this information later as long as the hardware is not deployed in an autonomous vehicle.

Watchdogs. The ACE hardware has internal watchdogs that can detect some failures in the main or service processors, causing them to reset and hopefully return to correct operation. The watchdogs require that the appropriate hardware provide them with regular updates to prove that the hardware is functioning. If the watchdog times out, it can reset the hardware device it watches.

Clocks. The ACE hardware provides clocks for each subcomponent, and provides interfaces by which these clocks can be synchronized with an external clock source. The ACE clocks have an internal hierarchy, where the clock on the Ethernet switch receives updates from outside the ACE and distributes it to clocks associated with other internal components.

PWM throttle signal control. The ACE hardware can take in a PWM signal from the throttle pedal and send out a similar signal to the engine. The hardware has circuitry to share these signals between the two ACEs, to control which ACE is able to generate this output, and to pass the pedal signal through to the engine when the ACEs are off or the autonomous vehicle is in manual driving. This behavior is controlled by internal signals that are generated by the processors. The default, when the ACE is powered down, must be to pass the pedal signal through to the engine without modification.

Figure 7:
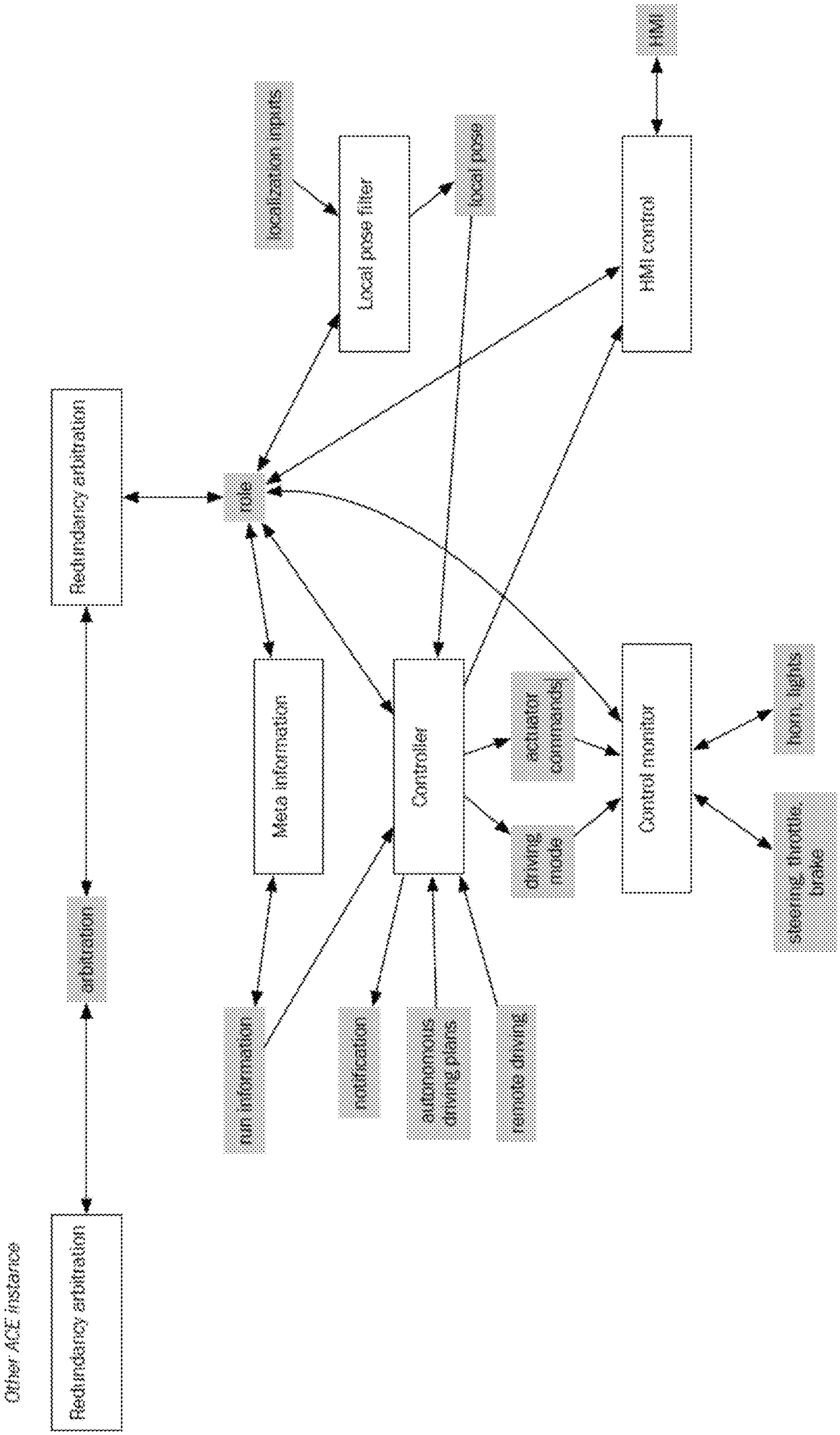
FIG. 7 illustrates an example application implemented and run on each of ACEs.

Referring now to FIG. 7, an example application implemented and run on each of ACEs is illustrated. The control system software is the collective name for all of the application software components that run within the control system. These applications may include: redundancy arbitration, controller, LPF, Meta, HMI controller, and service application. These applications are implemented as two independent copies, each running on one of the ACEs.

The redundancy scheme designates one ACE as primary, and the other (if available) as backup. All of the applications on the primary are given the primary role. Only primary instances of the application should be producing output that affects the autonomous vehicle's motion; the backup must take input and maintain state so that it is ready to take control (a "hot backup"), but not send output to the autonomous vehicle or to other autonomous driving components.

This approach to redundancy has the advantage of simplicity and minimal traffic; it has the disadvantage of coupling the redundancy status of all the applications. For example, the controller on one ACE could be functioning but not the Meta application; the reverse could occur on the other ACE. If the applications had redundancy managed independently, then the control system functions could be shared across the ACEs and the control system as a whole would still be operational. The choice to have one redundancy role for an entire ACE instance has been made in order to keep the first versions of the control system simple and easier to implement correctly. This is expected to have a negligible negative effect on control system reliability, offset by the improvement in reliability from a more robust, simpler redundancy scheme. This is a design choice that can be revisited in future versions.

Each of the application components may run within the application environment provided by the ACE infrastructure software. There are two general ways that the application components within the control system software relate to each other. The first is that most of the application components follow the lead of the redundancy arbitration component as to whether the application should behave as a primary or backup. The second is that some of these applications communicate information with each other, such as the controller using local pose information from the local pose filter.

The redundancy arbitration uses two internal interfaces: arbitration and role. The arbitration interface is how the redundancy arbitration logic applications on different ACEs communicate to decide on which node is primary and which is backup. The role interface is how the arbitration logic communicates roles to the other applications, and how the applications provide information about their health to the arbitration logic to be shared with their counterparts on the other ACE.

When the applications are told that they are on the ACE filling the primary role, they should both take in and process all inputs, as well as providing output to autonomous vehicle or autonomous driving systems. When the applications are told they are not primary (either because the role has not been established or because the role is backup), they should take in and process all inputs, but not send outputs outside the control system.

The application components that get their role instructions from the arbitration logic must follow a particular behavior pattern when the arbitration logic has a fault or stops. In general, every application must detect that the arbitration logic has failed using a timeout, and take on the pending role for as long as the application believes the arbitration logic has failed.

Figure 8:
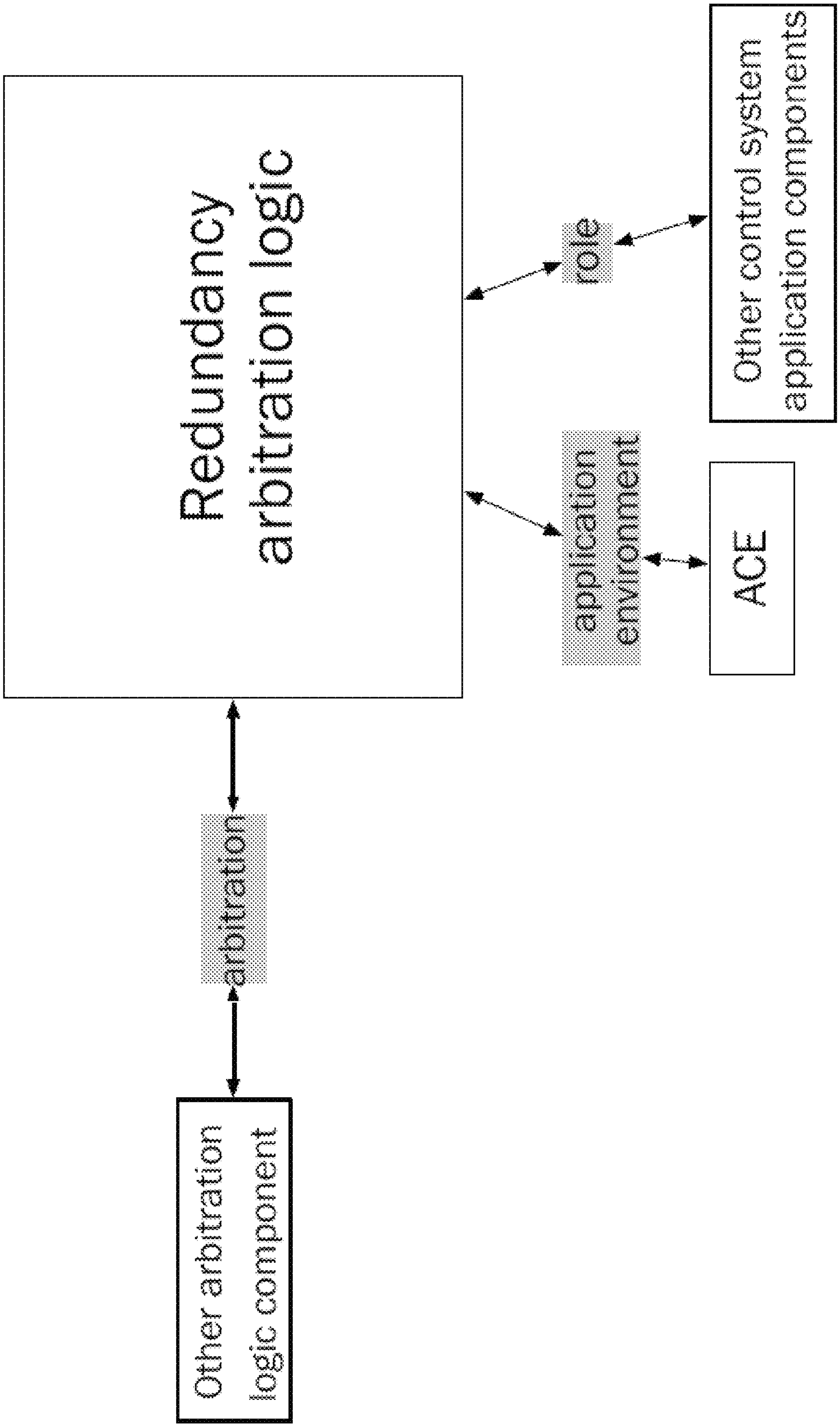
FIG. 8 illustrates an example redundancy arbitration logic.

Referring now to FIG. 8, an example of redundancy arbitration logic is illustrated. The redundancy arbitration logic determines what redundancy role a particular ACE and its applications should fill. The arbitration component communicates with the arbitration component on the other ACE to determine whether the other node is functioning correctly. The two arbitration components take into account how well each of the applications on their node is functioning as part of making the determination.

As the arbitration component makes decisions about role, it communicates that to the other application components running on the same ACE node. The decision about role potentially changes with each cycle of the arbitration logic's execution. The arbitration logic component also acts as a conduit for exchanging application-specific data between applications on the ACE nodes. This includes information that an application, such as the controller, can use to help the arbitration logic determine whether the other controller is functioning correctly. It also includes information that allows the backup to stay in sync with the primary (so that it is a hot backup that can take over control within one or two control cycles, rather than a cold or warm backup that would require more time to start providing correct service).

In this design, if the arbitration logic believes that the local ACE has a fault, or if it believes that the local applications are not functioning, the arbitration logic goes to a failed state. It remains in that failed state until the component is restarted. There is no attempt to monitor application or node health to detect when the situation has recovered and re-enter functioning service. This simplification has been made 1) in order to simplify the arbitration logic (by making a failure condition persistent) and 2) because the current higher-level design is to pull the autonomous vehicle over shortly after the control system loses redundancy. This design decision can be revisited in the future when there is a decision to revisit the higher-level decision to pull an autonomous vehicle over; if the higher-level decision is changed to try to continue autonomous vehicle operation if the control system is able to restore redundancy, then there is a reason to modify the design of the redundancy arbitration logic to try to recover. Until that higher-level change is made, however, there is no demand for the redundancy to restore operation after a failure.

Figure 9:
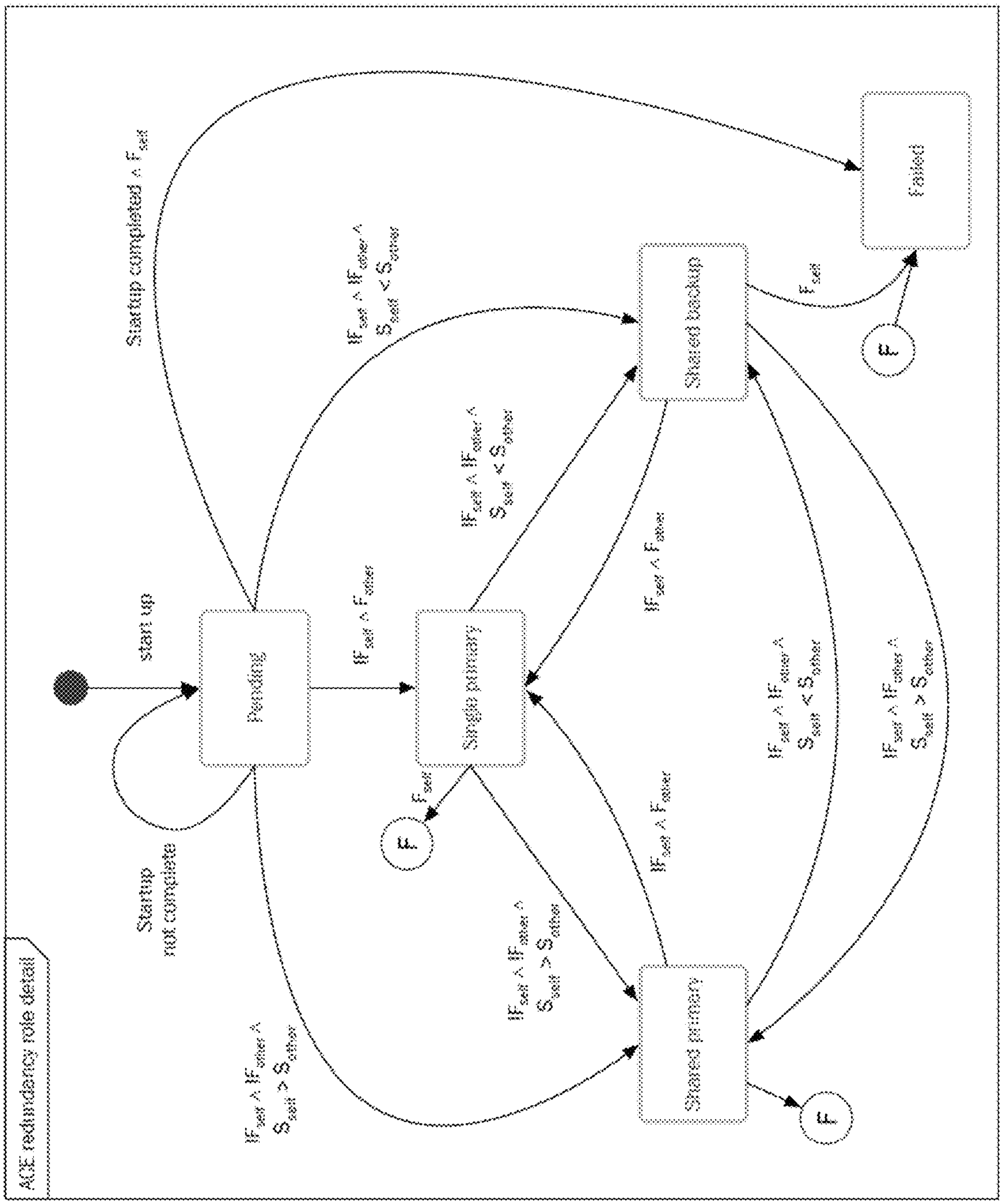
FIG. 9 illustrates an example state machine.

Referring now to FIG. 9, an example state machine is illustrated. The arbitration logic component maintains its belief about the role that the node on which it runs should play. This implements the state machine below, which is a specialization of the state machine presented in the general ACE state. It shows the set of applications running on the ACE that the arbitration logic should communicate with to give them current role information and to receive application state information. The application set should be defined either in the component software image or in configuration information. This set should not change while the arbitration logic is running. At present the application set is static, consisting of: controller, control monitor, local pose filter, HMI control, and meta information.

The protocol between ACEs relies solely on each node reporting its health and the health of its applications (as well as failure suspicion based on timeouts). In some previous iterations of the logic design, the controller on each node could evaluate the detailed health of the controller on the other node and declare the other node failed. This capability has been removed from this design. There are corner fault cases related to the arbitration logic component itself failing. In these cases, the application components must behave as if the ACE's role is pending. In some rare cases, this could leave an autonomous vehicle with both controllers inactive, leading to nothing providing control over the autonomous vehicle's motion. This corner case is addressed in the control monitor component's behavior in the pending state.

Health Scores

Each instance maintains the following information about its health. This information is used to decide which node is better able to provide service.

(a) A health score for this instance in general. The instance in general is functioning if the node, its application environment, and the arbitration logic component are all functioning and no failure has been detected of them.

(b) A health score for each application running on this node. This value is received periodically from each local application.

This information is a tuple <n, c, cm, l, h, m>, where n is a score for the local instance and the others are the health scores for each application.

The health score for an application describes whether that application is functioning or not, and if it is, how well it is functioning. Each application reports a value from 0 to 15 (that is, 0x0 to 0xf). A zero value means the application is not functioning or has failed. A 15 means that the application is functioning nominally. Intermediate values can be used to express degraded functionality.

| Health score | Meaning |
|---|---|
| 0-1 | The application is not functioning or has failed |
| 2-7 | The application is functioning but is not yet ready for use |
| 8-14 | The application is functioning and producing output, but the output quality is degraded from nominal |
| 15 | The application is functioning nominally |

Sometimes an application's failure will result in the application going silent, such as when it crashes. In those situations, the application cannot provide a score indicating failure. In that case the arbitration logic will record a score of 0, as if it had heard from the application that it had failed. However, the application can detect some internal failures and will communicate those when possible.

The health score values that can be used for the instance in general are:

| Health score | Meaning |
|---|---|
| 0 | The instance is not functioning or has failed |
| 2 | The instance is still starting up |
| 15 | The application is functioning nominally |

In many cases this score value will never be sent from one node to the other, because in many cases the failure will result in no communication. However, there are some cases where the node or the arbitration logic component is able to detect a failure and communicate that failure.

Node Priority

Each arbitration logic component selects a random number when it starts up. This random number is used in the exchange to determine which node will be primary and which backup when both are functioning. The node priority is used to break ties when the health scores indicate both nodes are equally good candidates for acting as primary.

This priority value must remain stable for extended periods of time; when the value changes, this can lead to the nodes changing their primary/backup role and thus introducing a short blip in autonomous vehicle control. There is no specific minimum period required for the priority remaining stable; the minimum should be chosen so as to keep the outages during role change to an acceptable level.

The actual value exchanged between arbitration logic components consists of the priority value selected with the serial number of the ACE appended. This ensures that each node has a unique value. The length of the random number field is not terribly important, but should be at least four bits, and the random number obtained should be uniformly distributed over the values the field can hold.

The arbitration logic component may periodically select a new node priority by selecting a new random number. Changing the node priority will, roughly half the time, cause the two ACEs to switch primary-backup roles. Causing a switch of roles will incur a short period when the control system is changing its configuration, and may result in a small number of controller cycles when no controller is providing control. As a result, it is recommended either not to change the priority after startup, or change it only rarely (e.g., once per hour).

The approach of using a random number to determine priority, rather than using static information like ACE serial number, will give both ACE nodes about equal chance of being the primary. This makes it unlikely that one ACE will have a hidden failure that remains undetected while functioning as backup.

Recent Application State

Each application can provide a small capsule of information that is exchanged via the arbitration logic component with its counterpart on the other ACE. This information allows the two instances of an application to maintain synchrony. The application data has a header that consists of the identifier for which the application generated the data and a timestamp. The application data payload is treated as opaque by the arbitration logic component; it has only a length and an array of uninterpreted bytes.

State Transitions

On each cycle of the arbitration logic, the application computes the role that ACE should fill for the next cycle period. The general rule is that the "better" node should be primary; a node is "better" if it is functioning, its applications are providing better service (as measured in their health scores), and it has higher priority.

This leads to four main triggers for transitions: Other has failed ($F_{other}$), Self has failed ($F_{self}$), Other is ready to start ($R_{other}$), Self is ready to start ($R_{self}$), Other is better ($S_{self}<S_{other}$), and Self is better ($S_{self}>S_{other}$).

These transitions are guarded by the following predicates, which formalize this notion of better. These predicates are on the values that a component knows about its local condition, and that a component believes about conditions on the other node.

Assume:

$F_i$ represents whether node i is believed to have failed or is not yet ready. For the self, this means that the arbitration logic has detected something about its environment or its own function that implies failure (including being in the failed state), or that one of the local applications has failed, or that some application is still initializing. For the other, this means either a suspicion that the other node has failed because a timeout has occurred waiting for a heartbeat message from the other node, or because the other node has reported a failure in its health score.

$R_i$ represents that a node i is running in general, and all of its applications are either in a non-failed but non-functioning state (1≤score≤7) or functioning (7<score≤15). This indicates that the node is ready to begin service but has not yet done so; one or more of its applications are waiting for the arbitration logic to determine whether the application should initialize its state based on the state of its counterpart on the other ACE or whether it should initialize its state to some zero state.

A health score S is represented as the tuple <n, c, cm, l, h, m>: the scores for the node as a whole, the controller, the control monitor, the local pose filter, the HMI controller, and the meta information applications, respectively.

$prio_i$ is the node priority value selected for node i.

Then:

$$F_A \leftrightarrow \exists\, i \,|\, \text{score } S_A.x \leq 7,\ x \in \{n, c, \text{cm}, l, h, m\}$$

$$R_A \leftrightarrow \exists\, i \,|\, S_A.n = 15 \wedge \text{score } S_A.x > 0,\ x \in \{c, \text{cm}, l, h, m\}$$

$$\text{score } S_A > \text{score } S_B \leftrightarrow$$

$$(A.n > B.n) \vee$$

$$(A.n = B.n \wedge A.cm > B.cm) \vee$$

$$(A.n = B.n \wedge A.cm > B.cm \wedge A.c > B.c) \vee$$

$$(A.n = B.n \wedge A.cm > B.cm \wedge A.c > B.c \wedge A.l > B.l) \vee$$

$$(A.n = B.n \wedge A.cm > B.cm \wedge A.c > B.c \wedge A.l > B.l \wedge A.h > B.h) \vee$$

$$(A.n = B.n \wedge A.cm > B.cm \wedge A.c > B.c \wedge A.l > B.l \wedge A.h > B.h \wedge A.m > B.m) \vee$$

$$(A = B \wedge prioA > prioB)$$

Note that RA implies !FA.

This predicate encodes the policy that the health of the node matters most, followed by the ability of the control monitor to function, followed by the ability of the controller to provide service, followed by local pose, followed by HMI and meta information. If the two tuples are equal, then the node with the higher priority is better. Note that given how the node priority is constructed, there is no possibility that both nodes have the same priority value.

| State | Input and guard | Next state | Comments |
|---|---|---|---|
| Off | Startup | Pending | |
| | Other inputs | n/a | |
| Pending | Self not ready (waiting for local applications to come up)<br>!Rself | Pending | Stay in the pending state until the local node is up and running, or the local node is determined to have failed |
| | Self is ready and other is not<br>Rself Λ!Rother | Single primary | Signal local applications to initialize state from scratch |
| | Self has failed Fself | Failed | |
| | Selfis ready and self is better<br>Rself ΛRother ΛSself > Sother | Shared primary | Signal local applications to initialize state from scratch |
| | Selfis ready and other is better<br>Rself ΛRother ΛSself < Sother | Shared backup | Signal local applications to initialize state from their counterpart (see note after table) |

-continued

| State | Input and guard | Next state | Comments |
|---|---|---|---|
| Single primary | Other has failed Fother | Single primary | |
| | Self has failed Fself | Failed | |
| | Self is better !Fself Λ!Fother ΛSself > Sother | Shared primary | Condition implies that a recent heartbeat has arrived from the other node, showing it is functional |
| | Other is better !Fself Λ!Fother ΛSself < Sother | Shared backup | |
| Shared primary | Other has failed Fother | Single primary | The other node appears to have failed. Disseminate single primary role to applications. Controller should initiate a pullover to stop the autonomous vehicle. |
| | Self has failed Fself | Failed | |
| | Self is better !Fself Λ!Fother ΛSself > Sother | Shared primary | |
| | Other is better !Fself Λ!Fother ΛSself < Sother | Shared backup | Should occur only when one node or the other has changed its node priority |
| Backup | Other has failed Fother | Single primary | The other node was primary and appears to have failed. Take over control by disseminating primary role to applications. Initiate a pullover to stop the autonomous vehicle. |
| | Self has failed Fself | Failed | |
| | Other is better !Fself Λ!Fother ΛSself < Sother | Backup | the autonomous vehicle. |
| | Self is better !Fself Λ!Fother ΛSself > Sother | Shared primary | Should occur only when one node or the other has changed its node priority |

It is necessary to discuss a subtlety in the transition from Pending to other states, when the applications must initialize their state. There are three cases to consider; in each of these cases, the applications and arbitration logic must move quickly to a correct state where at least one of the ACEs is primary and the corresponding applications are initialized and running.

This ACE is starting up, and the other ACE has failed (and will not start up). In this case, the arbitration logic will shortly conclude that the other ACE has failed. Some of its applications—notably the controller and local pose filter—will start up in a "running but uninitialized" state (health score 2 in these cases). These applications will stay in that uninitialized state until the arbitration logic concludes that its instance should be a single primary; on that transition, the arbitration logic must tell those applications that they should initialize their state from scratch.

Both ACEs are starting up concurrently, and the arbitration logic in both ACEs has taken on a pending role. Both ACEs will conclude that the other ACE is functioning, but both controllers and local pose filters will be at health score 2 (not finished initialization). As long as both controllers (or local pose filters) indicate the same health score for this waiting-to-initialize condition, then the arbitration logic instance will be able to determine which ACE should be primary based on node priority. The arbitration logic on the new primary tells its local applications to initialize their state from scratch, while the new backup tells its local applications to initialize from whatever state is sent from their counterpart on the primary. This may take one or two cycles to complete.

The other ACE is already up and running. This can occur either when one ACE boots well before the other, or when one controller instance starts up well after the other (perhaps because it crashed and is being restarted). In this case the arbitration logic for the controller that is starting will see heartbeats from the other ACE that show the other controller is up and running. In this case, the applications that are starting up must initialize their state from their currently running counterpart. Because the currently-running application instance will have a health score >7, the currently-running instance will always become the primary initially; the newly starting instance will be the backup, and the arbitration logic must tell the application to initialize its state from its counterpart. After the newly started ACE is up and running, the health scores of all the applications may converge (e.g., all to 15, functioning nominally). This may cause in the following cycle for the two ACEs to swap primary and backup roles based on their node priorities. However, this swap from primary to backup will not occur until the node that is starting up has initialized as a backup and its applications have obtained state from the running instances.

Frequency. The frequency of the arbitration logic executing its cycle is intended to match the frequency of the controller of 100 Hz (10 ms period). The phase of the two cycles is not assumed to match.

Failover time interval. The control system as a whole must complete a failover within 397 ms. The target for the arbitration control logic is to detect the need for failover and inform local applications within six cycles of the controller, or 60 ms.

Failure suspicion timeout. To meet the goal of 60 ms failover time, the arbitration logic should have a message timeout of 40 ms, or four cycles of the arbitration logic.

Independence. The arbitration logic must be independent of the applications it oversees (controller, control monitor, local pose filter, HMI control, and meta information) in the sense that they must not contend for resources, and it must be that none of the applications can interfere with the execution of the arbitration logic or vice versa (for example, by causing the arbitration logic to delay execution).

Physical Interfaces

The arbitration logic application instances use a CAN bus to communicate between the two ACEs. The specific CAN bus is not specified in this design at this time. The design choice to use a CAN bus instead of Ethernet or a different dedicated communication link was made because most vehicle actuation is done through CAN buses. Losing the ability to communicate over CAN to autonomous vehicle systems is a serious failure, and having that reflect in the messaging between the arbitration logic components reduces the cases where the components might only partially and inconsistently observe a failure.

Logical Interfaces

The arbitration logic component uses three major interfaces: the arbitration interface between the arbitration logic components on the two ACEs; the role interface between an arbitration logic component and local application components; and the interface to the local application environment.

Arbitration Interface

The arbitration interface is used to communicate between the two arbitration logic instances on the two ACEs. There are two groups of information to be exchanged: regular heartbeats and a startup handshake.

Heartbeat messages. The two arbitration logic components exchange heartbeat messages regularly, in order to support failure suspicion and to determine which instance is better suited to be primary. The heartbeat messages are sent in both directions between the instances, and are carried over a CAN bus.

The message contains:

| Field | Contents |
|---|---|
| Current role | The sender's current role (pending, single primary, shared primary, backup, failed) |
| Node priority | The sender's node priority value, consisting of a randomly chosen number with the sender's serial number appended |
| Health scores | The five health scores for the sender <n, c, 1, h, m> |
| Controller information | An opaque data structure containing information to be exchanged between controller application instances |
| LPF information | An opaque data structure containing information to be exchanged between local pose filter instances |
| Signature | A signature or checksum that allows the receiver to verify that the heartbeat message has not been corrupted or tampered with in transit |

Startup handshake. At startup, the two arbitration logic instances must determine whether they are compatible and authentic. The message is not defined in detail, but it should include: the version information for each instance, and an authentication exchange so that each instance can validate that the other was produced and deployed by approved Kodiak processes, has not been tampered with, and is authorized to be deployed.

Role Interface

The role interface supports the interaction between the arbitration logic component and the application components that follow its lead in their redundancy role. There are three messages involved: the role message going to an application, a status message coming from an application, and startup handshake.

The role interface messages are carried on some local inter-application communication channels provided by the application environment. Each channel is between the arbitration logic component and one other application.

Role message. The role message is how the arbitration logic component informs an application of the redundancy role it should fill. Note that a different message goes to each application on the ACE. This message contains: a current timestamp of when the redundancy role is valid; the current redundancy role (pending, single primary, shared primary, backup); whether the application should initialize its state from scratch or from its counterpart data; and an opaque data structure containing information received from the other node for that application.

Status message. An application uses this message to provide the arbitration logic information on its health and to provide an opaque information capsule that can be exchanged with its counterpart on the other ACE. The message contains: a current timestamp of when the message was generated; the current redundancy score for this application; and an opaque data structure containing information to be exchanged with the application counterpart. Only the controller and local pose filter include the exchanged information in their status.

Startup handshake. At startup, the arbitration logic and application components must determine whether they are authentic and compatible. This message is not defined in detail, but should include version information for each instance and an authentication exchange that allows each component to validate the other's authenticity, integrity, and authorization.

Application Environment Interface

The arbitration logic component is implemented as an application that runs in an ACE's application environment. In particular it uses the interface to the application environment to get the following information: (a) Clock: obtain fresh, unique timestamps; (b) Random number source: obtain random numbers; (c) Part and serial number: read the part and serial number of the ACE; and (d) Communications between ACEs and between local software components.

Figure 10:
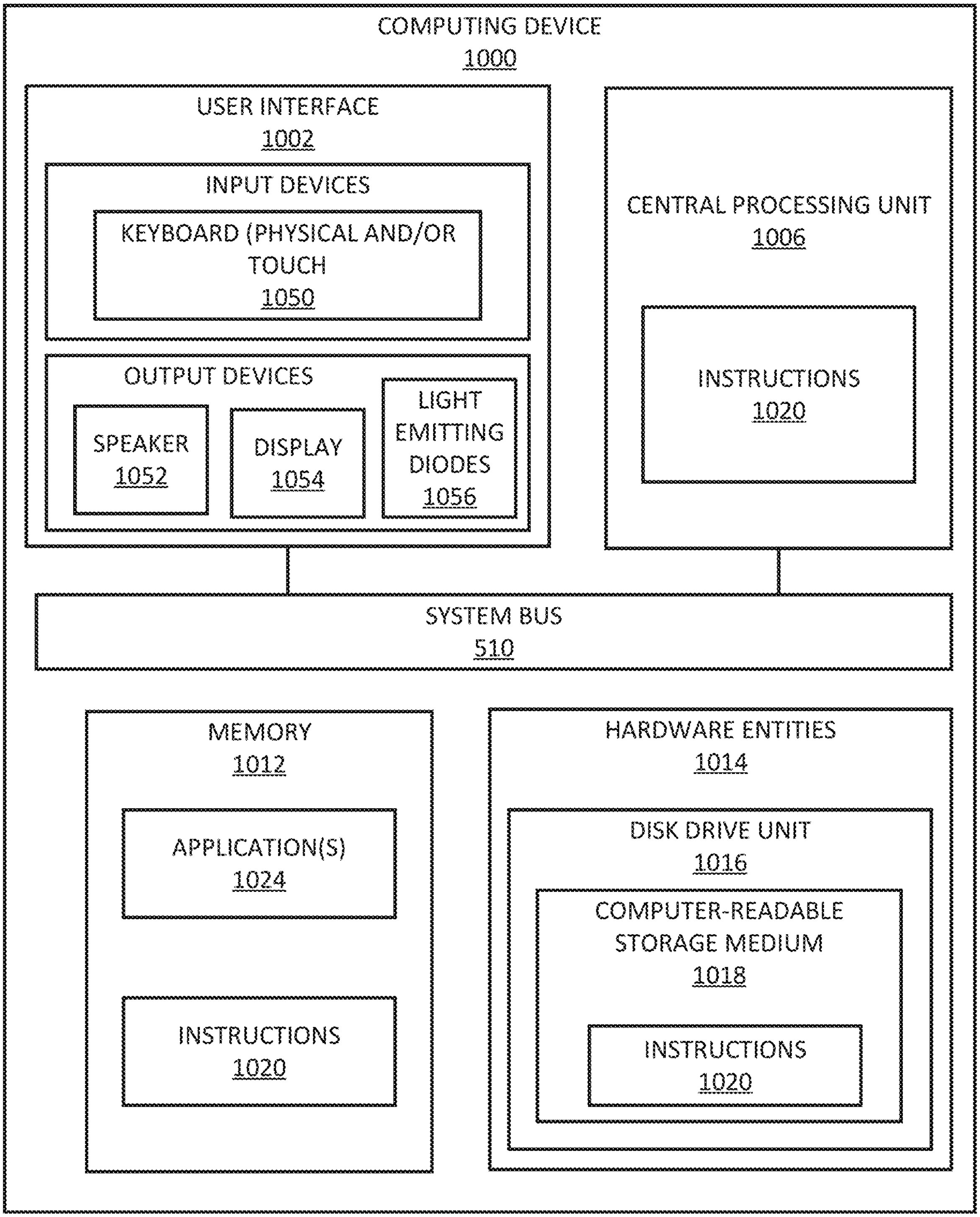
FIG. 10 illustrates example elements of a computing device, according to various embodiments of the present disclosure.

Referring now to FIG. 10, an illustration of an example architecture for a computing device 1000 is provided. The main computing system 210 or the redundant ACE system 220 of FIG. 1 may be the same as or similar to computing device 1000. As such, the discussion of computing device 1000 is sufficient for understanding the main computing system 210 or the redundant ACE system 220 of FIG. 1, for example.

Computing device 1000 may include more or fewer components than those shown in FIG. 1. The hardware architecture of FIG. 10 represents one example implementation of a representative computing device configured to one or more methods and means for controlling the automated vehicle 100 in response to an abnormal condition of the automated vehicle 100, as described herein. As such, the computing device 1000 of FIG. 10 implements at least a portion of the method(s) described herein (for example, method 300 of FIG. 3 and/or method 400 of FIG. 4).

Some or all components of the computing device 1000 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 10, the computing device 1000 comprises a user interface 1002, a Central Processing Unit ("CPU") 1006, a system bus 1010, a memory 1012 connected to and accessible by other portions of computing device 1000 through system bus 1010, and hardware entities 1014 connected to system bus 1010. The user interface can include input devices and output devices, which facilitate user-software interactions for controlling operations of the computing device 1000. The input devices may include, but are not limited to, a physical and/or touch keyboard 1050. The input devices can be connected to the computing device 1000 via a wired or wireless connection (e.g., a Bluetooth® connection). The output devices may include, but are not limited to, a speaker 1052, a display 1054, and/or light emitting diodes 1056.

At least some of the hardware entities 1014 perform actions involving access to and use of memory 1012, which can be a Random Access Memory (RAM), a disk driver and/or a Compact Disc Read Only Memory (CD-ROM), among other suitable memory types. Hardware entities 1014 can include a disk drive unit 1016 comprising a computer-readable storage medium 1018 on which is stored one or more sets of instructions 1020 (e.g., programming instructions such as, but not limited to, software code) configured to implement one or more of the methodologies, procedures, or functions described herein. The instructions 1020 can also reside, completely or at least partially, within the memory 1012 and/or within the CPU 1006 during execution thereof by the computing device 1000. The memory 1012 and the CPU 1006 also can constitute machine-readable media. The term "machine-readable media," as used here, refers to a single medium or multiple media (e.g., a centralized or distributed database, and/or associated caches and servers) that store the one or more sets of instructions 1020. The term "machine-readable media," as used here, also refers to any medium that is capable of storing, encoding or carrying a set of instructions 1020 for execution by the computing device 1000 and that cause the computing device 1000 to perform any one or more of the methodologies of the present disclosure.

Figure 11:
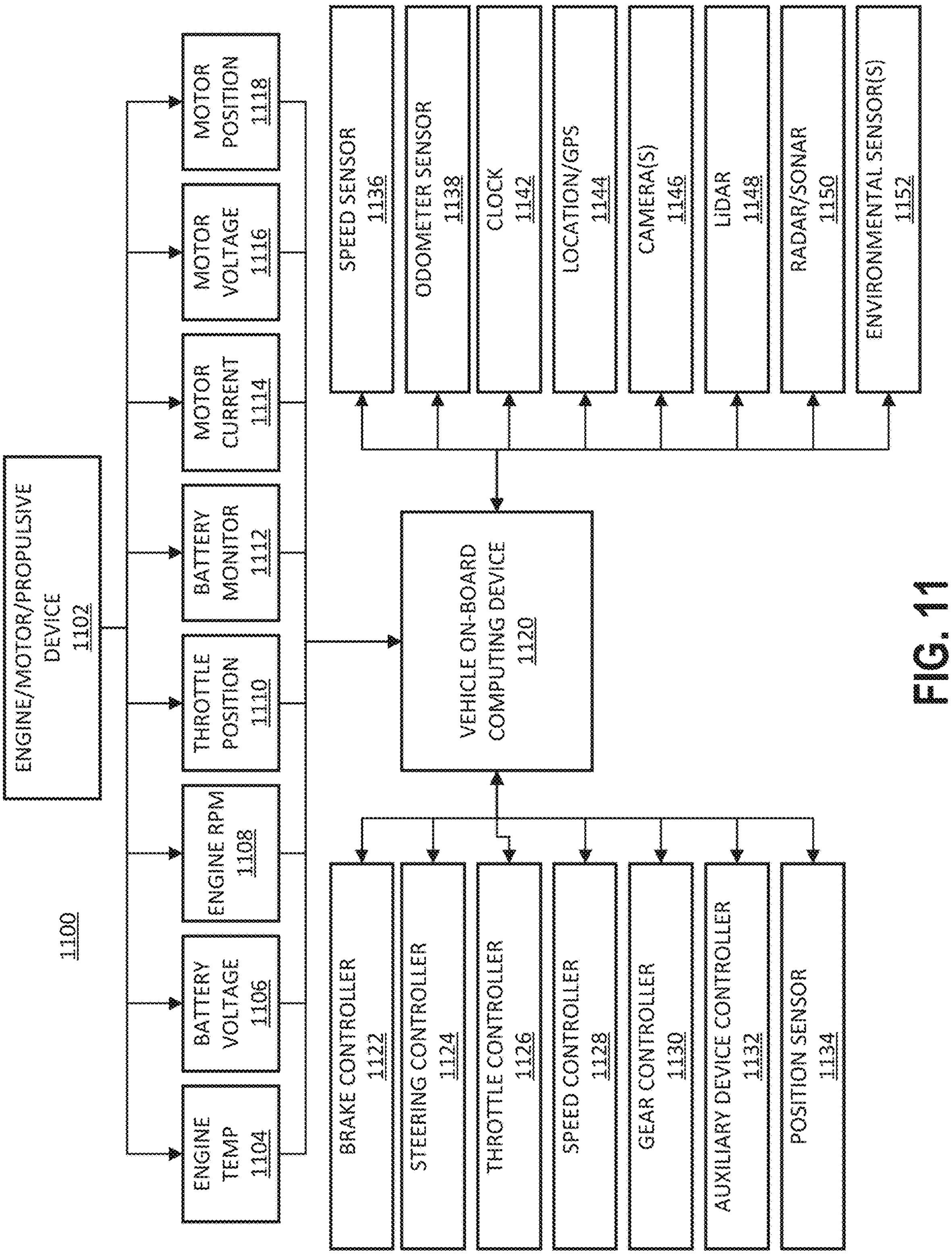
FIG. 11 illustrates an example architecture of a vehicle, according to various embodiments of the present disclosure.

Referring now to FIG. 11, an example vehicle system architecture 1100 for a vehicle is provided, in accordance with various embodiments of the present disclosure.

The automated vehicle 100 of FIG. 1 can have the same or similar system architecture as shown in FIG. 11. Thus, the following discussion of vehicle system architecture 1100 is sufficient for understanding the automated vehicle 100 of FIG. 1.

As shown in FIG. 11, the vehicle system architecture 1100 includes an engine, motor or propulsive device (e.g., a thruster) 1102 and various sensors 1104-1118 for measuring various parameters of the vehicle system architecture 1100. In gas-powered or hybrid vehicles having a fuel-powered engine, the sensors 1104-1118 may include, for example, an engine temperature sensor 1104, a battery voltage sensor 1106, an engine Rotations Per Minute (RPM) sensor 1108, and/or a throttle position sensor 1110. If the vehicle is an electric or hybrid vehicle, then the vehicle may have an electric motor, and accordingly will have sensors such as a battery monitoring system 1112 (to measure current, voltage and/or temperature of the battery), motor current 1114 and voltage 1116 sensors, and motor position sensors such as resolvers and encoders 1118.

Operational parameter sensors that are common to both types of vehicles include, for example, a position sensor 1134, such as an accelerometer, gyroscope and/or inertial measurement unit; a speed sensor 1136; and/or an odometer sensor 1138. The vehicle system architecture 1100 also may have a clock 1142 that the system uses to determine vehicle time during operation. The clock 1142 may be encoded into the vehicle onboard computing device 1120. It may be a separate device, or multiple clocks may be available.

The vehicle system architecture 1100 also may include various sensors that operate to gather information about the environment in which the vehicle is traveling. These sensors may include, for example, a location sensor 1144 (for example, a Global Positioning System (GPS) device); object detection sensors such as one or more cameras 1146; a LiDAR sensor system 1148; and/or a radar and/or a sonar system 1150. The sensors also may include environmental sensors 1152, such as a precipitation sensor and/or ambient temperature sensor. The object detection sensors may enable the vehicle system architecture 1100 to detect objects that are within a given distance range of the vehicle 1100 in any direction, while the environmental sensors 1152 collect data about environmental conditions within the vehicle's area of travel.

During operations, information is communicated from the sensors to an onboard computing device 1120. The onboard computing device 1120 may be configured to analyze the data captured by the sensors and/or data received from data providers, and may be configured to optionally control operations of the vehicle system architecture 1100 based on the results of the analysis. For example, the onboard computing device 1120 may be configured to control: braking via a brake controller 1122; direction via a steering controller 1124; speed and acceleration via a throttle controller 1126 (in a gas-powered vehicle) or a motor speed controller 1128 (such as a current level controller in an electric vehicle); a differential gear controller 1130 (in vehicles with transmissions); and/or other controllers.

Geographic location information may be communicated from the location sensor 1144 to the onboard computing device 1120, which may then access a map of the environment that corresponds to the location information to determine known fixed features of the environment such as streets, buildings, stop signs and/or stop/go signals. Captured images from the cameras 1146 and/or object detection information captured from sensors such as LiDAR 1148 are communicated from those sensors to the onboard computing device 1120. The object detection information and/or captured images are processed by the onboard computing device 1120 to detect objects in proximity to the vehicle. Any known or to be known technique for making an object detection based on sensor data and/or captured images may be used in the embodiments disclosed in this document.

The present disclosure is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A method of controlling an autonomous vehicle in response to an abnormal condition, comprising:

generating, by a main computing system, a nominal motion plan and a fallback motion plan for each predetermined interval from a location of the vehicle based on data received by the main computing system about environment of the vehicle, wherein the fallback motion plan is generated to safely stop the vehicle;

sending, by the main computing system, the nominal motion plan and the fallback motion plan for the each predetermined interval to a redundant actuator control engine (ACE) system comprising a first ACE and a second ACE;

updating an existing nominal motion plan and an existing fallback motion plan in the first ACE and the second ACE, by the redundant ACE system, with the nominal motion plan and the fallback motion plan, respectively, for the each predetermined interval;

controlling the vehicle, by one of the first ACE and the second ACE, according to the nominal motion plan;

detecting, by the redundant ACE system, an abnormal condition of the vehicle; and in response to the abnormal condition, assigning by a redundancy arbitration logic one of the first ACE and the second ACE as a primary ACE to control the vehicle and perform a predetermined vehicle action comprising navigating the vehicle to a safe stop based on an output actuator command generated by the primary ACE according to the fallback motion plan that is received before detection of the abnormal condition, wherein the redundancy arbitration logic is separate and isolated from other control system application components, and wherein the redundancy arbitration logic comprises an arbitration interface between arbitration logic components on the first ACE and the second ACE, a role interface between an arbitration logic component and local application components, and an interface to a local application environment, wherein the arbitration interface exchanges heartbeat messages between the arbitration logic components on the first ACE and the second ACE, the heartbeat messages comprising at least a current role, a node priority value, and health scores for the arbitration logic component and the local application components, and wherein the role interface communicates a current redundancy role to each of the local application components and receives a health score status from each of the local application components.

2. The method of claim 1, wherein the redundancy arbitration logic determines roles of the other control system application components.

3. The method of claim 2, wherein the redundancy arbitration logic receives health scores from the other control system application components.

4. The method of claim 3, wherein:

a health score of 0-1 represents that an application component is malfunctioning or has failed;

a health score of 2-7 represents that the application component is functioning but is not ready for use;

a health score of 8-14 represents that the application component is functioning and producing output, but the output quality is degraded from nominal; and/or a health score of 15 represents that the application component is functioning normally.

5. The method of claim 2, wherein the redundancy arbitration logic receives health scores from the first ACE and the second ACE.

6. The method of claim 5, wherein:

a health score of 0-1 represents that the first ACE or the second ACE is malfunctioning or has failed;

a health score of 2-7 represents that the first ACE or the second ACE is functioning but is not ready for use;

a health score of 8-14 represents that the first ACE or the second ACE is functioning and producing output, but the output quality is degraded from nominal; and/or a health score of 15 represents that the first ACE or the second ACE is functioning normally.

7. The method of claim 6, wherein the redundancy arbitration logic assigns one of the first ACE and the second ACE that has a higher health score as the primary ACE.

8. The method of claim 6, wherein the redundancy arbitration logic assigns one of the first ACE and the second ACE that has a lower health score as a backup ACE.

9. The method of claim 1, wherein the redundant ACE system is configured to control the vehicle upon detection of the abnormal condition without further communicating with the main computing system.

10. A system of controlling an autonomous vehicle in response to an abnormal condition, comprising a main computing system, a redundant actuator control engine (ACE) system comprising a first ACE and a second ACE, and a redundancy arbitration logic, wherein the main computing system is configured to:

generate a nominal motion plan and a fallback motion plan for each predetermined interval from a location of the vehicle based on data received by the main computing system about environment of the vehicle, wherein the fallback motion plan is generated to safely stop the vehicle; and send the nominal motion plan and the fallback motion plan for the each predetermined interval to the first ACE and the second ACE of the redundant ACE system; and wherein the redundant ACE system is configured to:

update an existing nominal motion plan and an existing fallback motion plan in the first ACE and the second ACE with the nominal motion plan and the fallback motion plan, respectively, for the each predetermined interval;

control the vehicle according to the nominal motion plan;

detect an abnormal condition of the vehicle; and in response to the abnormal condition, cause the redundancy arbitration logic to assign one of the first ACE and the second ACE as a primary ACE to control the vehicle to perform a predetermined vehicle action comprising navigating the vehicle to a safe stop based on an output actuator command generated by the primary ACE according to the fallback motion plan that is received before detection of the abnormal condition, wherein the redundancy arbitration logic is separate and isolated from other control system application components, and wherein the redundancy arbitration logic comprises an arbitration interface between arbitration logic components on the first ACE and the second ACE, a role interface between an arbitration logic component and local application components, and an interface to a local application environment, wherein the arbitration interface exchanges heartbeat messages between the arbitration logic components on the first ACE and the second ACE, the heartbeat messages comprising at least a current role, a node priority value, and health scores for the arbitration logic component and the local application components, and wherein the role interface communicates a current redundancy role to each of the local application components and receives a health score status from each of the local application components.

11. The system of claim 10, wherein the redundancy arbitration logic determines roles of the other control system application components.

12. The system of claim 11, wherein the redundancy arbitration logic receives health scores from the other control system application components.

13. The system of claim 12, wherein:

a health score of 0-1 represents that an application component is malfunctioning or has failed;

a health score of 2-7 represents that the application component is functioning but is not ready for use;

a health score of 8-14 represents that the application component is functioning and producing output, but the output quality is degraded from nominal; and/or a health score of 15 represents that the application component is functioning normally.

14. The system of claim 11, wherein the redundancy arbitration logic receives health scores from the first ACE and the second ACE.

15. The system of claim 14, wherein:

a health score of 0-1 represents that the first ACE or the second ACE is malfunctioning or has failed;

a health score of 2-7 represents that the first ACE or the second ACE is functioning but is not ready for use;

a health score of 8-14 represents that the first ACE or the second ACE is functioning and producing output, but the output quality is degraded from nominal; and/or a health score of 15 represents that the first ACE or the second ACE is functioning normally.

16. The system of claim 15, wherein the redundancy arbitration logic assigns one of the first ACE and the second ACE that has a higher health score as the primary ACE.

17. The system of claim 15, wherein the redundancy arbitration logic assigns one of the first ACE and the second ACE that has a lower health score as a backup ACE.

18. The system of claim 10, wherein the redundant ACE system is configured to control the vehicle upon detection of the abnormal condition without further communicating with the main computing system.

* * * * *